(12) United States Patent
Glass et al.

(10) Patent No.: US 10,217,107 B2
(45) Date of Patent: Feb. 26, 2019

(54) STORED VALUE CARD KIOSK SYSTEM AND METHOD

(71) Applicant: Gift Card Impressions, LLC, Kansas City, MO (US)

(72) Inventors: Brett R. Glass, Kansas City, MO (US); Karl Joseph Geisler, Olathe, KS (US); Kimberly Beth Hoag, Roeland Park, KS (US)

(73) Assignee: Gift Card Impressions, LLC, Kansas City, MO (US)

( * ) Notice: Subject to any disclaimer, the term of this patent is extended or adjusted under 35 U.S.C. 154(b) by 0 days.

(21) Appl. No.: 13/946,679

(22) Filed: Jul. 19, 2013

(65) Prior Publication Data

US 2014/0330660 A1 Nov. 6, 2014

Related U.S. Application Data

(60) Provisional application No. 61/818,789, filed on May 2, 2013.

(51) Int. Cl.
*G06Q 20/20* (2012.01)
*G06Q 20/34* (2012.01)

(52) U.S. Cl.
CPC ................. *G06Q 20/354* (2013.01)

(58) Field of Classification Search
CPC .... G06Q 20/10; G06Q 20/18; G06Q 20/1085; G06Q 20/342; G07F 19/20; G07F 17/42
USPC .................... 705/24, 21, 16, 39, 44
See application file for complete search history.

(56) References Cited

U.S. PATENT DOCUMENTS

| | | | |
|---|---|---|---|
| 4,982,346 A | 1/1991 | Girouard et al. | |
| 5,652,421 A | 7/1997 | Veeneman et al. | |
| 7,331,521 B2 | 2/2008 | Sorenson et al. | |
| 7,360,710 B2 | 4/2008 | Lindahl et al. | |
| 8,200,544 B1 * | 6/2012 | Jones ................. | G06Q 30/0207 705/26.1 |
| 8,280,775 B2 | 10/2012 | Mark Strong | |
| 8,308,554 B2 | 11/2012 | Rowe et al. | |
| 8,342,391 B2 | 1/2013 | Morrison et al. | |
| 8,396,758 B2 | 3/2013 | Paradise et al. | |

(Continued)

FOREIGN PATENT DOCUMENTS

| | | |
|---|---|---|
| WO | 2014/179597 A1 | 11/2014 |
| WO | 2014/179611 A1 | 11/2014 |

OTHER PUBLICATIONS

Olive Garden—screen shots of actual kiosk screens.
(Continued)

*Primary Examiner* — Vanel Frenel
(74) *Attorney, Agent, or Firm* — Erise IP, P.A.

(57) ABSTRACT

A stored value card activation system includes a server in communication with one or more computing devices configured in kiosks. The server receives stored value card type information associated with one of multiple non-activated stored value cards from the computing device. The server also receives monetary amount information to be associated with the selected stored value card from the kiosk, and payment information from a user of the kiosk. From this information, the server conducts a financial transaction with a financial account server associated with an account of the user, and activates the selected stored value card in accordance with the financial transaction.

12 Claims, 22 Drawing Sheets

(56) References Cited

U.S. PATENT DOCUMENTS

| | | |
|---|---|---|
| 8,561,894 B1 | 10/2013 | Mullen et al. |
| 2002/0165923 A1 | 11/2002 | Prince |
| 2003/0001005 A1* | 1/2003 | Risafi ............... G07F 7/1008 |
| | | 235/380 |
| 2003/0004889 A1 | 1/2003 | Fiala et al. |
| 2003/0055735 A1* | 3/2003 | Cameron ............ G06Q 20/04 |
| | | 705/27.1 |
| 2004/0139318 A1 | 7/2004 | Fiala et al. |
| 2005/0086168 A1* | 4/2005 | Alvarez ............ G06Q 20/027 |
| | | 705/41 |
| 2005/0116028 A1* | 6/2005 | Cohen ................ G06Q 20/04 |
| | | 235/380 |
| 2005/0154644 A1 | 7/2005 | Deakin et al. |
| 2006/0037835 A1* | 2/2006 | Doran ................ G06Q 20/10 |
| | | 194/302 |
| 2006/0074767 A1* | 4/2006 | Fortney .............. G06Q 30/02 |
| | | 705/26.1 |
| 2007/0168283 A1* | 7/2007 | Alvarez ........... G06Q 20/1085 |
| | | 705/43 |
| 2007/0174123 A1 | 7/2007 | Dorr |
| 2007/0215699 A1 | 9/2007 | Arego et al. |
| 2008/0235095 A1 | 9/2008 | Oles et al. |
| 2008/0306804 A1 | 12/2008 | Opdycke et al. |
| 2009/0121832 A1 | 5/2009 | Mullin et al. |
| 2009/0197684 A1 | 8/2009 | Arezina et al. |
| 2009/0222318 A1 | 9/2009 | Anelevitz et al. |
| 2009/0281915 A1 | 11/2009 | Deakin et al. |
| 2010/0004935 A1 | 1/2010 | Wain |
| 2010/0041368 A1* | 2/2010 | Kumar .................. G06Q 20/02 |
| | | 455/407 |
| 2010/0070075 A1 | 3/2010 | Chirnomas |
| 2010/0123002 A1* | 5/2010 | Caporicci ........... G06Q 20/22 |
| | | 235/380 |
| 2010/0138037 A1 | 6/2010 | Adelberg et al. |
| 2010/0280921 A1 | 11/2010 | Stone et al. |
| 2011/0087550 A1 | 4/2011 | Fordyce, III et al. |
| 2011/0161226 A1* | 6/2011 | Courtion ............ G06Q 20/10 |
| | | 705/39 |
| 2011/0161231 A1 | 6/2011 | Sievel et al. |
| 2011/0234514 A1 | 9/2011 | Gothard |
| 2011/0275432 A1 | 11/2011 | Lutnick et al. |
| 2012/0004769 A1 | 1/2012 | Hallenbeck et al. |
| 2012/0109787 A1* | 5/2012 | Larrick ............... G06Q 20/10 |
| | | 705/27.1 |
| 2012/0203572 A1 | 8/2012 | Christensen |
| 2012/0323650 A1 | 12/2012 | Blaze et al. |
| 2013/0173363 A1 | 7/2013 | Chen |
| 2014/0330660 A1 | 11/2014 | Glass et al. |
| 2015/0178701 A1 | 6/2015 | Glass et al. |
| 2015/0220902 A1 | 8/2015 | Glass et al. |

OTHER PUBLICATIONS

Subway—screen shots of actual kiosk screens.
Elevate Digital advertisement of services.
Elevate Digital advertising specs.
International Preliminary Report on Patentability (Chapter I of the Patent Cooperation Treaty) from related International Application No. PCT/US2014/036432, dated Nov. 12, 2015; 7 pgs.
International Search Report and Written Opinion from related International Application No. PCT/US2014/036432, dated Sep. 9, 2014; 8 pgs.
International Preliminary Report on Patentability (Chapter I of the Patent Cooperation Treaty) from related International Application No. PCT/US2014/036408, dated Nov. 12, 2015; 11 pgs.
International Search Report and Written Opinion from related International Application No. PCT/US2014/036408, dated Sep. 9, 2014; 12 pgs.
U.S. Appl. No. 13/946,749 relevant file history dated Feb. 25, 2014 to Jul. 28, 2016.
U.S. Appl. No. 14/578,067 relevant file history dated Nov. 3, 2017 to Feb. 1, 2018.
U.S. Appl. No. 14/622,695 relevant file history dated Jan. 5, 2016 to Jan. 2, 2018.
U.S. Appl. No. 14/828,948 relevant file history dated May 19, 2016 to Jan. 3, 2018.
U.S. Appl. No. 14/947,936 relevant file history dated Jun. 30, 2017 to Jan. 24, 2018.

\* cited by examiner

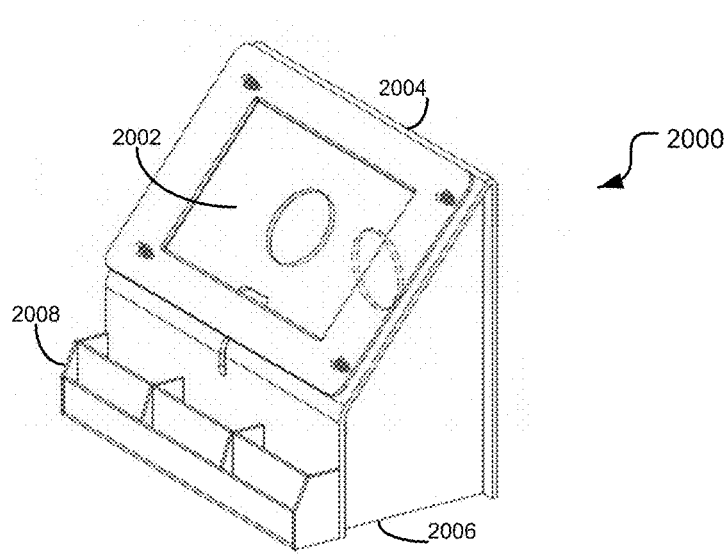
Fig. 20A
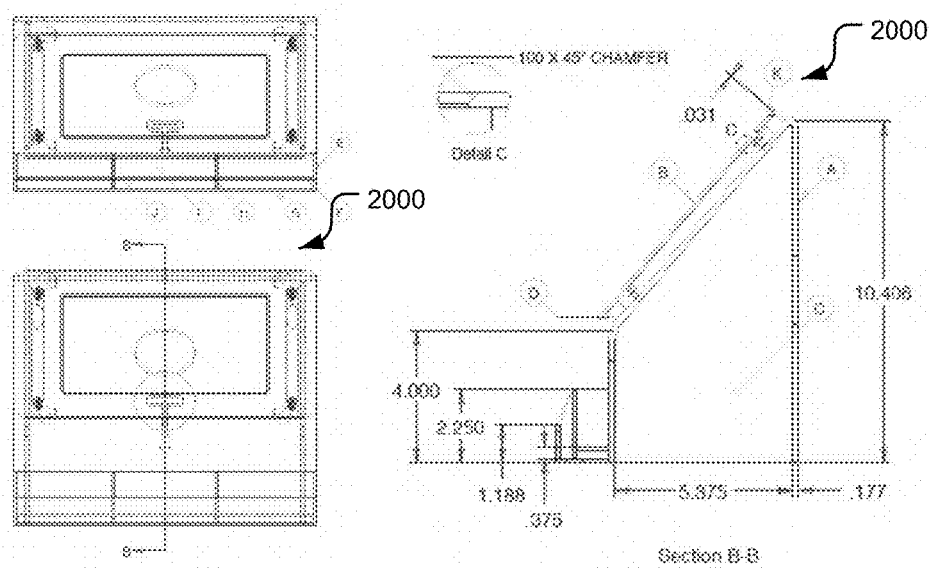
Fig. 20B
Fig. 20C

STORED VALUE CARD KIOSK SYSTEM AND METHOD

RELATED APPLICATIONS

This application takes priority to U.S. Provisional Patent Application Ser. No. 61/818,789, filed May 2, 2013, and entitled "Gift Card Kiosk System and Method," the contents of which is incorporated herein by reference in its entirety.

FEDERALLY SPONSORED RESEARCH OR DEVELOPMENT

Not Applicable.

COMPACT DISK APPENDIX

Not Applicable.

FIELD OF INVENTION

The present invention generally relates to retail devices, and more particularly, to a stored value card kiosk system and method. Additionally, the present invention relates to a housing structure for housing and supporting a computing device to generate a graphical user interface (GUI) for activation of stored value cards.

BACKGROUND

Transaction cards, or stored value cards, such as pre-paid phone services, general purpose, reloadable credit/debit cards, including open loop and closed loop prepaid cards, and the like, have become popular gifts. Stored value cards typically comprise a certain cash equivalent value that is encoded upon a magnetic strip applied to the surface of the card. This stored value may be determined by the vendor prior to packaging and display for sale or is selected at the point of sale by the purchaser and loaded by the cashier using a magnetic card reader/writer. Holders for stored value cards have been used both to simply store stored value cards and to provide a surface for decorative indicia and graphics, as well as personalized or preprinted text.

Stored value cards are typically displayed in a retail outlet in their non-activated (i.e., blank) form, and only activated manually at a point-of-sale (POS) terminal of the retail outlet. Nevertheless, this manual process may be relatively costly and time consuming to the retail outlet in that manual intervention is required. Additionally, sales of these stored value cards may be encumbered due to a substantial separation between a purchase decision by the consumer and the actual purchase of these stored value cards. What is needed is a system that provides for automated activation of stored value cards at or close to a point of purchase decision point where the stored value cards are displayed.

SUMMARY

Embodiments of the stored value card kiosk system may provide a solution to conventional stored value card purchasing systems using a graphical user interface (GUI) for activating stored value cards where these stored value cards are displayed, such as on a kiosk disposed in a retail outlet or other suitable location. The GUI is controlled by a computing device that conducts a transaction with a merchant associated with the stored value card and a financial account holder associated with the purchaser to activate the stored value card in an automated manner.

According to one aspect, a stored value card activation system includes a server in communication with one or more computing devices configured in kiosks. The server receives stored value card type information associated with one of multiple non-activated stored value cards from the computing device. The server also receives monetary amount information to be associated with the selected stored value card from the kiosk, and payment information from a user of the kiosk. From this information, the server conducts a financial transaction with a financial account server associated with an account of the user, and activates the selected stored value card in accordance with the financial transaction.

According to another aspect, a kiosk includes a housing structure and a computing device in communication with a server. The computing device receives stored value card type information associated with one of multiple non-activated stored value cards. The computing device also receives monetary amount information to be associated with the selected stored value card, and payment information from the user for conducting a financial transaction with a financial account server associated with an account of the user, and activating the selected stored value card in accordance with the financial transaction.

According to another aspect, a stored value card activation method includes receiving stored value card type information associated with a selected one of the plurality of non-activated stored value cards from a computing device configured in a kiosk, monetary amount information to be associated with the selected stored value card from the kiosk, and payment information from a user of the kiosk. From this information, the method conducts a financial transaction with a financial account server associated with an account of the user, and activates the selected stored value card in accordance with the financial transaction.

BRIEF DESCRIPTION OF THE DRAWINGS

FIGS. 20A through 20E illustrate another example stored value card kiosk according to the teachings of the present disclosure.

DETAILED DESCRIPTION

Although stored value cards have been become a commonly accepted gifting medium, their use has not been without limitation. For example, conventionally implemented stored value cards typically require manual intervention for their activation. Embodiments of the present disclosure provide a solution to this problem with a stored value card kiosk that provides for activation of stored value cards via a housing structure that supports a display that generates a graphical user interface (GUI) from which stored value cards may be activated. Embodiments may include an online, interactive activation platform, whereby a computing device configured in a kiosk may send and receive digital messages for activating the stored value card by a merchant associated with the stored value card and conducting a transaction with a financial account (e.g., credit card account) associated with the user.

Figure 1:
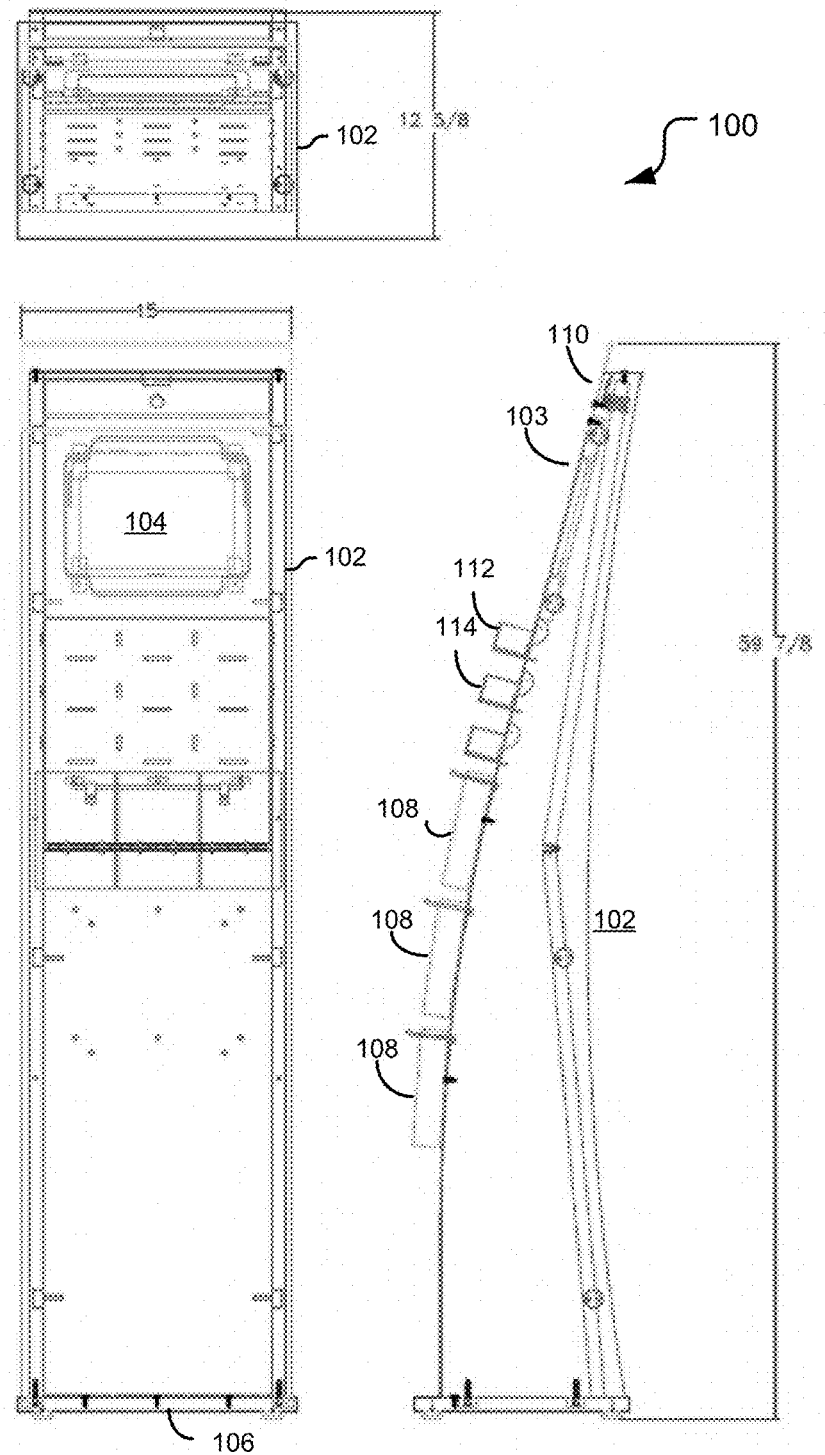
FIG. 1 illustrates an example stored value card kiosk according to the teachings of the present disclosure.

FIG. 1 illustrates an example stored value card kiosk 100 according to the teachings of the present disclosure. The stored value card kiosk 100 generally includes a housing structure, which in this particular embodiment, is a floorstand housing 102 that houses and supports a computing device 103 having a display 104. In other embodiments, the housing structure may be any type that supports the computing device 103 in a manner suitable for providing interaction with a user through its display 104, such as a pedestal, an adjustable support arm, or the like. Other types of housing structures will be described in detail below.

The computing device 103 generates a graphical user interface (GUI) to the display 104 for providing interaction with a user (e.g., a stored value card consumer). The floorstand housing 102 has a bottom end 106 for support from and/or mounting to a floor, and is dimensioned such that a user having a standard height may access the GUI in a relatively comfortable manner. In the particular embodiment shown, for example, the floorstand housing 102 has a height of 59 and ⅞ inches, a width of 15 inches, and a depth of 12 and ⅝ inches. Nevertheless, other embodiments of the floorstand housing 102 may have other dimensions without departing from the spirit or scope of the present disclosure. For example, other embodiments of the floorstand housing 102 may have a height greater or less than 59 and ⅞ inches, a width greater or less than 15 inches, and/or a depth of greater or less than 12 and ⅝ inches.

The floorstand housing 102 may be made of any suitable material, such as wood, plastic, composites, and/or metal, that supports the computing device 103 and display 104 in a structurally sound manner. The floorstand housing 102 may also include one or more pockets 108 for housing various ancillary items, such as non-activated stored value cards and/or paraphernalia associated with stored value cards. The stored value cards may be any type of card that may be associated with a monetary amount to be redeemed for one or more products or services. Examples of such stored value cards include for example, pre-paid phone service cards, general purpose credit cards, debit cards, and the like.

Each pocket 108 includes a cavity into which the ancillary items may be placed, and is formed of a generally rigid material, such as sheet metal that is attached to the side of the housing 102. Nevertheless, other embodiments may include any type of housing structure for housing ancillary items associated with the activation of stored value cards. The kiosk 100 also includes an optional camera 110 for surveillance purposes and a card reader 112 as will be described in detail below. Additionally, the kiosk 100 may include a cash processing unit 114 that receives cash payment from the user, and dispenses monetary change for any cash amount received in excess of the required transaction fee for activating the stored value card. The particular embodiment shown merely describes one arrangement of the display 104, pockets 108, camera 110, card reader 112, and cash processing unit 114 configured on the housing 102 and that other arrangements may be provided without departing from the spirit and scope of the present invention. For example, the camera 110 may be configured at any desired position and orientation on the housing 102 for gathering images of ambient surroundings of the housing 102, such as consumers who may use the stored value card activation system 100.

Figure 2A:
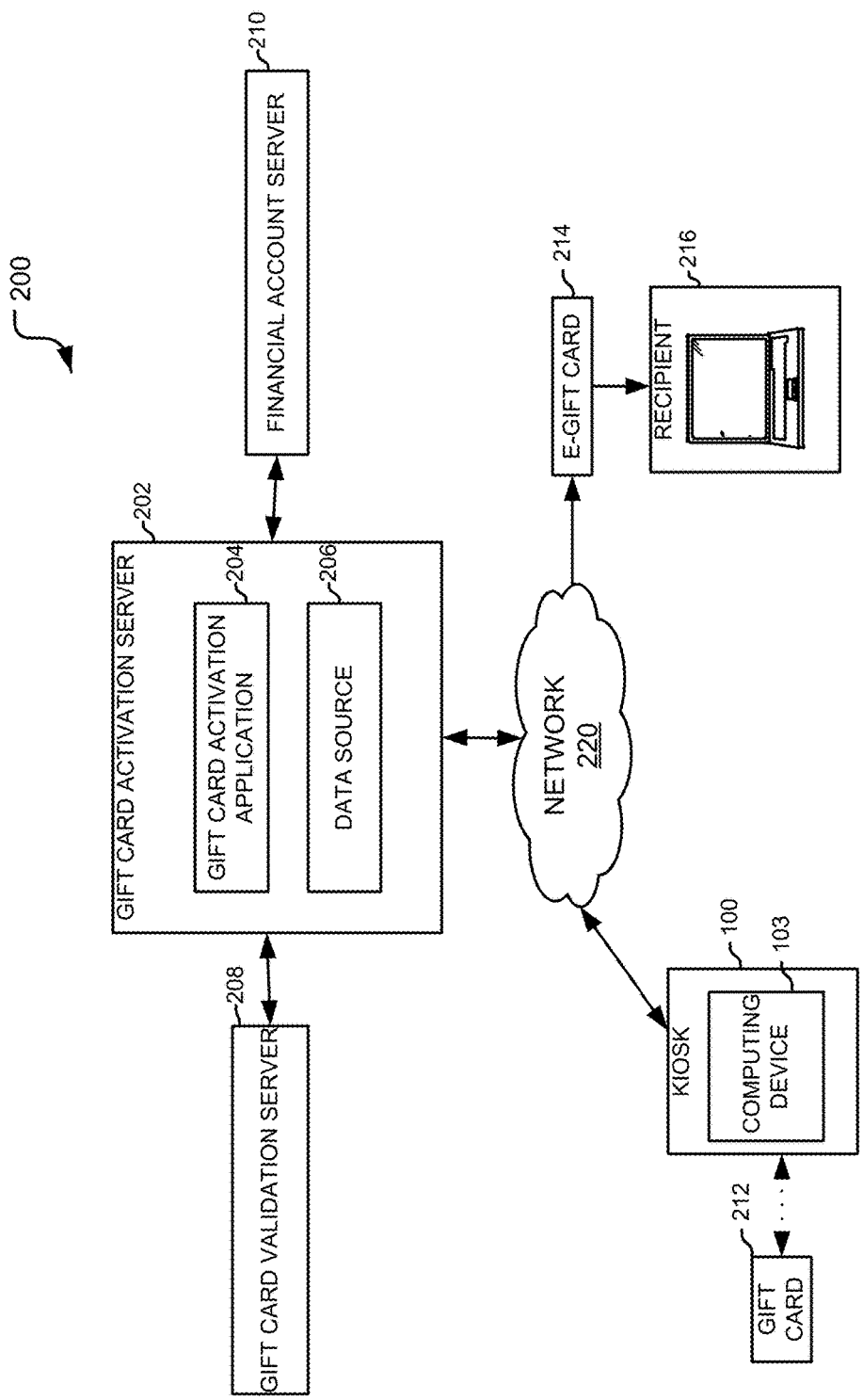
FIG. 2A is a block diagram of a computing system that includes a stored value card activation system.
Figure 2B:
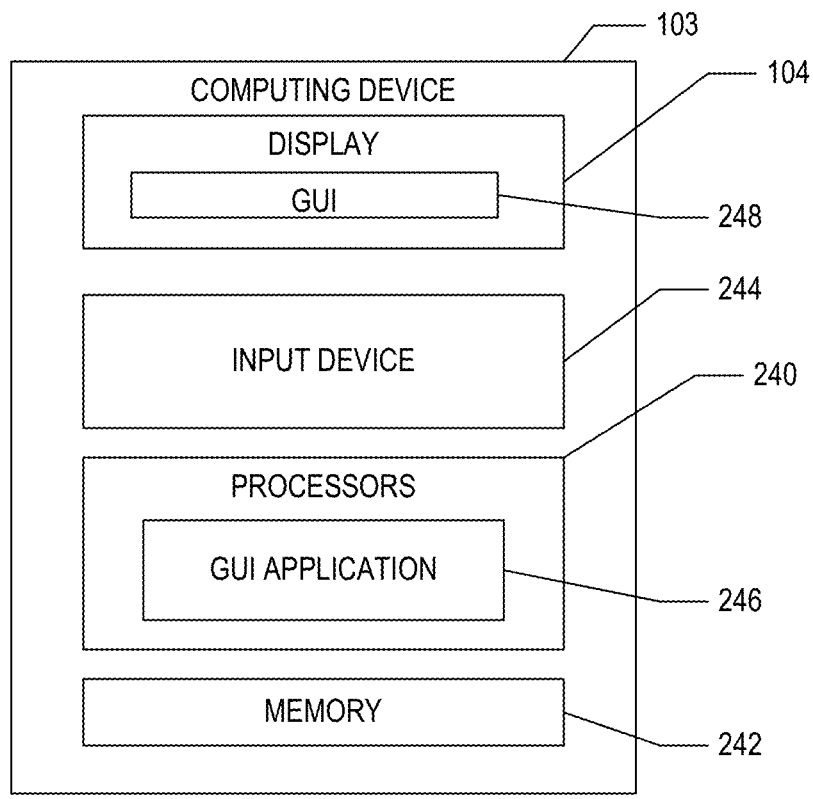
FIG. 2B depicts an exemplary embodiment of a computing device according to one aspect of the stored value card activation system.
Figure 2C:
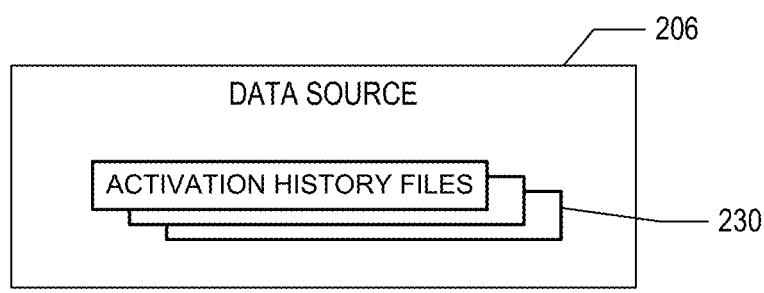
FIG. 2C depicts an exemplary embodiment of a data source according to an aspect of the stored value card activation system.

FIGS. 2A through 2C depict an example stored value card activation system 200 according to aspects of the disclosure. The system 200 includes a stored value card activation server 202 or other computing device or system that includes a stored value card activation application 204 and a data source 206. As will be described in detail below, the stored value card activation application 204 receives stored value card activation information from the computing device 103 of the kiosk 100 and facilitates activation of a selected stored value card 212 via the stored value card validation server 208, and a monetary transaction via a financial account server 210 of the user and the stored value card validation server 208 to pay for the activated stored value card 212. The stored value card may be physical stored value card 212 or may be a digital stored value card (e-stored value card) 214 that may be transmitted to a computing device of a recipient 216 via a messaging service, such as e-mail, a short message service (SMS), or a multimedia message service (MMS), or other suitable digital communication medium.

The server 202 communicates with a website of a retailer, such as a mail order retailer, or processing center of a retailer or other entity that processes incoming orders for products and fulfills these orders by managing shipment of the ordered product to the purchaser or other recipient and payment for the ordered product from the purchaser. The server 202 includes a processing system 302 (FIG. 3) that execute the stored value card activation application 204 stored in volatile and/or non-volatile memory 304 (i.e., computer readable media) using the data source 206. Examples of a server 202 include one or more servers, personal computers, mobile computers and/or other mobile devices, and other computing devices. The server 202 may communicate via wireless and/or wireline communications.

In one embodiment, the server 202 communicates with a financial account server 210 that is associated with a financial account of the user to provide payment for the activated stored value card by the user. The server 202 may also communicate with the computing device 103 to receive cash payment via the cash processing unit 114. The financial account may be any type, such as a credit card account, a debit card account, or a PAYPAL™ account. Prior to activation of the stored value card, the server 202 facilitates a financial transaction between the stored value card validation server 208 and the financial account server 210 associated with the user to provide payment for the stored value card. The stored value card validation server 208 and the financial account server 210 have one or more processors and executable instructions stored in volatile and/or non-volatile memory for performing the actions and/or steps described herein.

In another embodiment, the server 202 provides stored value card type information, monetary amount information, and payment information to the stored value card activation server 208 such that the stored value card activation server 208 conducts the transaction by communicating with the financial account server 210 and activating the stored value card associated with the transaction. For example, the server 202, upon receipt of stored value card type information, monetary amount information, and payment information from the computing device 104, transmits this information to a website of the merchant hosted on the stored value card validation server 208. In turn, the website executes an process that negotiates the transaction with the financial account server 210 of the consumer, activates the selected stored value card, and transmits one or more messages back to the computing device 104 indicating whether or not the transaction has succeeded or not.

The computing device 103 has one or more processors and volatile and/or non-volatile memory. Examples of a computing device 103 include one or more personal computers, mobile computers and/or other mobile devices, and other computing devices. In one embodiment, the computing device comprises a tablet computer. The computing device 103 may communicate via wireless and/or wireline communications.

The data source 206 stores activation history files 230 including activation information associated with each transaction that may be tracked and stored. Although the data source 206 is shown as being located on, at, or within the local server 202, it is contemplated that the data source 206 can be located remotely from the local server 202 in other aspects of the system 200, such as on, at, or within a database of a data management system or a database of another computing device or system having at least one processor and volatile and/or non-volatile memory. In one embodiment, the data source 206 comprises a relational database management system, such as a MySQL-based database structure that provides a front end for entry and access of data stored therein and provides for replication for increased reliability and/or mirroring by other sites that use the stored value card kiosk 100.

The communication network 220 can be the Internet, an intranet, or another wired and/or wireless communication network. In one aspect, one or more of the server 202 and the computing device 103 communicate with one another using any suitable protocol or messaging scheme. For example, the server 202 and computing device 103 may communicate using a Hypertext Transfer Protocol (HTTP), extensible markup language (XML), extensible hypertext markup language (XHTML), or a Wireless Application Protocol (WAP) protocol. Other examples of communication protocols exist. Although the example of FIG. 2A shows the server 202 communicating with the computing device 103 through a network, other embodiments contemplate the server 202 communicating directly with the computing device 103 without the use of a separate and a distinct network. Additionally, other embodiments contemplate that the modules employed by the server 202 and the computing device 103 are integrated in one computing system. Further, the servers 208 and 210 alternatively may communicate with the stored value card activation server 202 via the network.

FIG. 2B depicts an example embodiment of a computing device 103 of the kiosk according to one aspect of the stored value card activation system 200. The computing device 103 is a computing or processing device that includes one or more processors 240 and memory 242 and is to receive data and/or communications from, and/or transmit data and/or communications to, the server 202 via the communication network 220. The computing device 103 includes a display 104, such as a computer monitor, for displaying data and/or a graphical user interface 248. The computing device 103 may also include an input device 244, such as a keyboard or a pointing device (e.g., a mouse, trackball, pen, or touch screen) to enter data into or interact with the graphical user interface 248. In one embodiment, the display 104 comprises a touchscreen device in which input is provided via contact by the user with the touchscreen device.

The computing device 103 may also include a graphical user interface (or GUI) application 246, such as a browser application, or application software (i.e., a mobile app) stored in the memory 242 and executed on the processors 240 to generate a graphical user interface 248 to the display 104. The graphical user interface 242 enables the computing device 103 of the user to interact with one or more data entry forms received from the server 202 to enter order detail data and submit orders to the application 204 for the purpose of activating a stored value card that may be sent to the recipient 216.

In one embodiment, the computing device 103 is a commercial off-the-shelf (COTS) computing device, such as a personal computer, a mobile computer, a tablet computer, a mobile device, and/or other computing device that is configured in or on the housing 102 using one or more mounting mechanisms, such as screws, bolts, hooks, zip ties, adhesives, track system, or other mechanism, such as one that maintains the computing device in or on the housing 102 using a tensioning mechanism. Such as COTS device includes a charging tether for providing power to the computing device, and/or a security or lasso tether to prevent its theft.

In another embodiment, the computing device 103 includes a custom design with the display 104, audio generation device 246, processors 240, and memory 242 individually integrated into the housing 102. For example, the display 104 and audio generation device 246 may be mounted on a surface of the housing 102 using a suitable attachment mechanism for providing advertising content to consumers. Example of such attachment mechanisms include, for example hinges and/or adhesives, such as weldment, hot glue, epoxy, and the like. Another example includes a housing 102 made of plastic that includes tabs integrally formed on the housing that hold the display 104 and audio generation device 246 in or on the housing 102 using a press-type fit. Yet another example includes tabs integrally formed on the housing 102 that are bent by the application of heat to secure the display 104, audio generation device 246, processors 240, and/or memory 242 to the housing 102.

In a particular embodiment, the computing device 103 is a tablet computer and the advertising content display application 248 is embodied as application software (i.e., an app) designed to be executed on the computing device 103. The operating software may be configured as a permissions-based format such that only the app is allowed to execute for administering the stored value card advertising system 100. That is, consumers may be inhibited from executing any other application on the computing device 103. Additionally, the app may be locked (i.e., inhibited from executing) in response to detection of a tampering event and/or due to malfunction of the system. The stored value card advertising server 102 may also include administrator privileges (e.g. super user mode) that can be accessed via a unique key combination (e.g., password access) for servicing, maintaining, or otherwise administering the operation of the computing device 103. The tablet computer may be configured on the housing 102 such that its display is oriented in either a landscape mode or a portrait mode.

Figure 3:
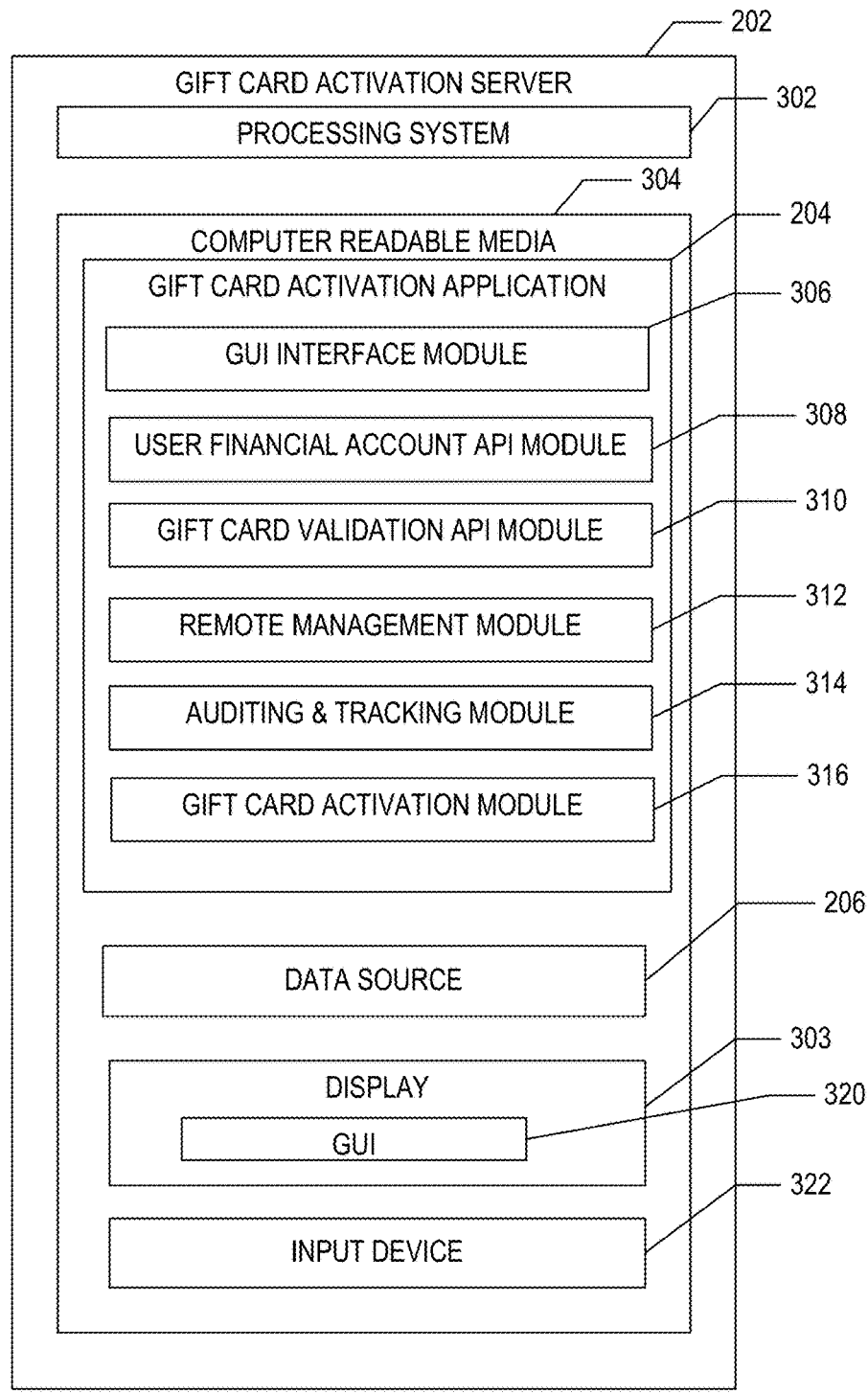
FIG. 3 is a block diagram of an example computing device that includes a stored value card activation application.

FIG. 3 is a block diagram depicting an example stored value card activation application 204 executing on the stored value card activation server 202. According to one aspect, the stored value card activation server 202 includes a processing system 302 that includes one or more processors or other processing devices. A processor is hardware. The processing system 302 executes the stored value card activation application 204 to generate a GUI on a display of the computing device 103 in order to receive customized information from a user and generate a stored value card to be sent to a recipient. According to another aspect, the stored value card activation server 202 also includes a display 303, such as a computer monitor, for displaying data and/or a graphical user interface 320. The stored value card activation server 202 may also include an input device 322, such as a keyboard or a pointing device (e.g., a mouse, trackball, pen, or touch screen) to enter data into or interact with the graphical user interface 322.

According to one aspect, the stored value card activation server 202 includes a computer readable media 304 on which the stored value card activation application 204 and data source 106 are stored. The stored value card activation application 204 includes instructions or modules that are executable by the processing system 302 to generate customized stored value cards to be sent to recipients.

The computer readable media 304 may include volatile media, nonvolatile media, removable media, non-removable media, and/or another available media that can be accessed by the stored value card activation server 202. By way of example and not limitation, computer readable media 304 comprises computer storage media and communication media. Computer storage media includes non-transient storage memory/media, volatile media, nonvolatile media, removable media, and/or non-removable media implemented in a method or technology for storage of information, such as computer/machine readable/executable instructions, data structures, program modules, and/or other data. Communication media may embody computer readable instructions, data structures, program modules, or other data and include an information delivery media or system.

A GUI interface module 306 facilitates the receipt of data and/or other communications from the computing device 103 of the kiosk 102. In one example, the computing device 103 executes a graphical user interface (GUI) that displays an interactive display, or other suitable user interface mechanism including one or more selectable fields, editing screens, and the like for receiving instructions and data and activating the card by the user (i.e., sender).

A user financial account API module 308 communicates with a payment processing server, such as the financial account server 210, to transact a monetary transfer of funds from the user's financial account to a financial account of a merchant of the stored value card.

The stored value card validation API module 310 communicates with the stored value card activation server 208 for activation of the stored value card. For example, the stored value card activation server 208 may be a server managed by a merchant associated with the stored value card. For another example, the stored value card activation server 208 may be a third party server of a third party stored value card activation service for activation of the stored value card. Examples of such third party stored value card activation service include INCOMM™, SVS™, FIRST DATA™, and STORE FINANCIAL™ stored value card activation services.

In one embodiment, the stored value card validation API module 310 communicates with a specified stored value card activation server from among multiple stored value card activation servers 208 according to the stored value card type information received from the computing device 103. For example, merchants often delegate the activation of their stored value cards to one or more of the available third party activation services such as those described above. Thus, a particular third party activation service may, or may not, be configured to process stored value card transactions of stored value cards associated with a particular merchant. Moreover, certain merchants may have a preferred certain stored value card activation service to be designated as a primary source, and one or more other stored value card activation services to be designated as secondary sources to be used only when the primary source is not available. The stored value card validation API module 310, upon receipt of stored value card type information from the computing device 103, communicates with a particular stored value card activation server specified for use with that merchant using the stored value card type information. For example, the stored value card validation API module 310 may include a lookup table that associates the merchant of each stored value card with a particular stored value card activation service. Additionally, the lookup table may associate each merchant with a preferred field indicating a primary stored value card activation source and a secondary field indicating secondary stored value card activation sources to use in the primary source is not available.

A remote management module 312 communicates with the computing device 103 of the kiosk 100 to manage various aspects of its operation. For example, the remote management module 314 may communicate with the computing device 103 to ensure its proper operation, and disable the computing device 103 from further operation if a failure or malfunction is detected. In one embodiment, the remote management module 312 may erase the memory of the computing device 103 if a fraudulent event is detected. Also, the remote management module 312 may provide for remote access to the computing device 103 from the stored value card activation server 202. The remote management module 314 may also communicate with the computing device 103 to administer software updates to the computing device 103.

In one embodiment, the remote management module 312 may communicate with one or more sensors of the kiosk 100 for surveillance and/or fraud detection purposes. For example, the remote management module 312 may receive images and/or video information from a camera of the kiosk 100. During a stored value card activation procedure described herein, the camera may take an image of the user at periodic intervals (e.g., 5 second intervals) and/or at events, such during user input or selection of certain fields, and the computing device 103 stores the images for future reference in the event that a fraudulent event is detected at a later time. Alternatively, the computing device 103 transmits the images to a stored value card activation server 202 for storage in the data source 206.

In another embodiment, the remote management module 312 generates a GUI 320 that displays various activities and provides for administrative control of one or more computing devices 103 of the kiosk 100 from the stored value card activation server 202. For example, the GUI 320 may be generated in the form of a dashboard in which multiple characteristics of each of multiple computing devices 103 may be monitored and controlled. The GUI 320 is generated on the display 303 of the server 202 and various fields of the GUI 320 controlled via the input device 322 of the server 202.

The GUI 320 may display various characteristics of each computing device 103, such as an index to any log files associated with the operation of its respective computing device 103. For example, the log files may include sales data, location data obtained via a location detection device (e.g., global positioning system (GPS) device) of the computing device 103, device health, a history of fraudulent alerts, and any images/video obtained via the camera of the kiosk 100.

Additionally, the GUI 320 may receive user input via the input device 322 to control the operation of the computing device 103. For example, an administrator may, from the display 303 and input device 322 of the server 202, control the computing device 103 to inhibit or allow certain functionality, perform periodic maintenance on the computing device 103, and/or access one or more log files associated with the operation of the computing device 103.

An auditing and tracking module 314 maintains a historical record of transactions conducted through the use of the kiosk 100 by storing the transactions in the activation history files 230. For example, the auditing and tracking module 314 may periodically report (or report upon demand) usage information associated with the kiosk 100. This usage information may include, for example, which type of stored value cards are most often activated and a distribution of how much money is activated on these cards. Information such as this may be useful for distribution to merchants that offer stored value cards to solicit their further use of the stored value card kiosk 100.

A stored value card activation module 316 facilitates the activation of the stored value card by managing the activation of the stored value card by the stored value card activation server 208, and handling the financial transaction from the financial account server 210 of the user to the account of the merchant that issued the stored value card. The stored value card activation module 316 may either receive payment from the user via a financial account server 210 associated with the user, or may receive cash payment for the stored value card via the cash processing unit 114. For example, if the stored value card activation module 316 receives information from the computing device 103 indicating that the user wishes to dispense cash for activation of the stored value card, the stored value card activation module 316 communicates with the cash processing module 114 to accept a monetary amount for the stored value card from the user. Alternatively, if the stored value card activation module 316 receives information from the computing device 316 indicating that the user wishes to conduct an electronic monetary transaction, the stored value card activation module 316 may then communicate with user financial account API module 308 to conduct an electronic financial transaction with a financial account server of the user.

A physical stored value card or a digital stored value card (e-stored value card) may be activated. In one embodiment, an e-stored value card may be generated in digital form and transmitted to the recipient via any suitable communication mechanism, such as via an e-mail message or a short message service (SMS) message. The e-stored value card may be printable in a form suitable for redemption at a retail outlet of a merchant associated with the e-stored value card. In another embodiment, a non-activated physical stored value card may be activated by swiping the physical stored value card 212 using the card reader 112 of the kiosk 100.

It should be appreciated that the modules described herein are provided only as an example of a computing device that may execute the stored value card activation application 204 according to the teachings of the present invention, and that other computing devices may have the same modules, different modules, additional modules, or fewer modules than those described herein. For example, one or more modules as described in FIG. 3 may be combined into a single module. As another example, certain modules described herein may be encoded and executed on other computing devices, such as the computing device 103 used by the user. Further, one or more or all of the modules may be stored and executed by the stored value card activation server 202 and data and instructions are transmitted to and from the stored value card activation server 202 and the computing device 103 to execute their functions.

Figure 4:
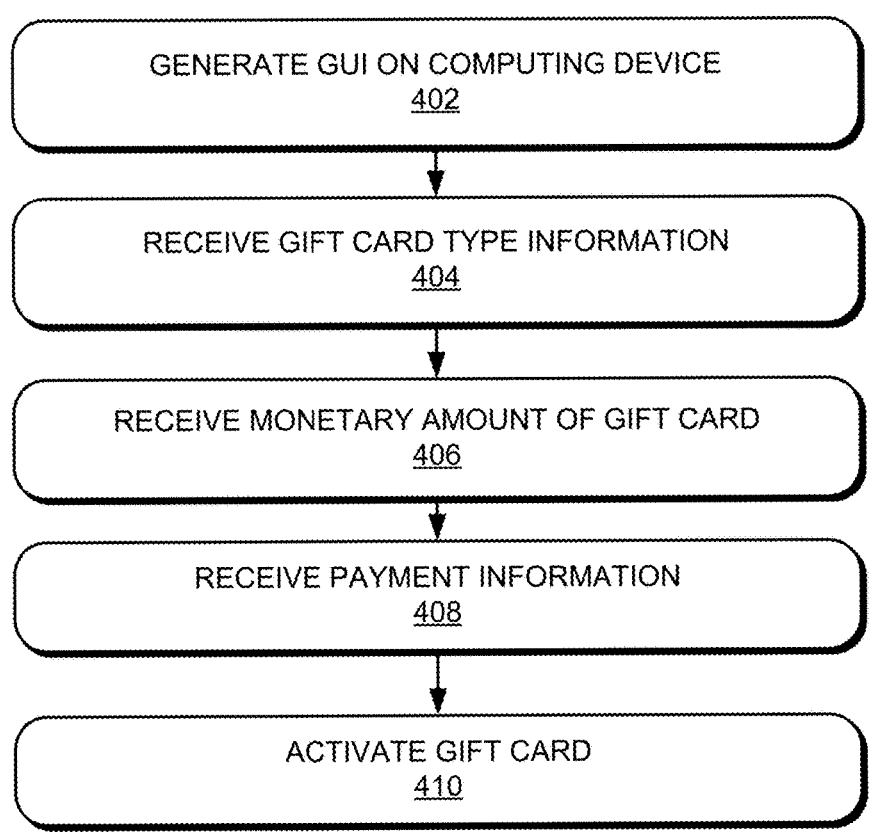
FIG. 4 is a flowchart depicting an example process for creating a stored value card holder according to an aspect of the stored value card activation system.

FIG. 4 illustrates an example process that may be performed by the stored value card activation application 204 according to the teachings of the present disclosure. Although the example process described herein below is directed primarily to activation of a gift card, it should be understood that the example process may also be directed to activation of any suitable stored value card, such as a pre-paid phone service card, a general purpose, reloadable credit/debit card, and the like.

In step 402, a GUI is generated to the display of the computing device 103 of the kiosk 100. The computing device 103 may function as a thin client such that the stored value card activation application 204 administers the generation of the GUI on the computing device 103. In another embodiment, the computing device 103 includes instructions in its memory for generating the GUI on its display, such as by application software (i.e., an app) designed to be executed on the computing device 103 embodied as a tablet computer or other similar type of portable computing device. In another example, the GUI module is on the stored value card activation server 202, and the stored value card activation server generates the GUI screens to the display of the computing device 103.

Figure 5:
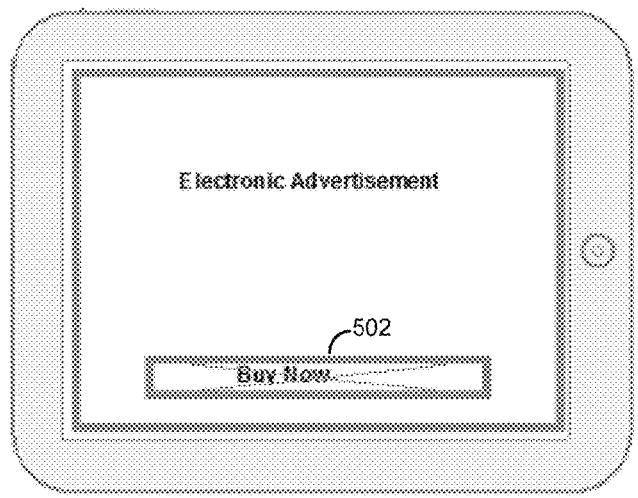
FIG. 5 illustrates an example of an advertising screen according to an aspect of the stored value card activation system.

According to one aspect, the application 204 generates an advertising screen (FIG. 5) for displaying advertising content for view by consumers. The advertising content includes various forms of information for marketing the stored value cards activated by the system 200. The marketing content may be presented in any suitable form, such as a video segment, an animation, a text message, audio message, or any combination thereof. For example, the advertising screen generates multiple short (e.g., 30 second) video segments that are sequentially displayed on the display 104 of the computing device 103 in which each segment is tailored to enhance a perceived appeal of one or more stored value cards for consumers.

As another example, marketing content (e.g., advertisements, special offers, etc.) may be displayed on any of the screens described herein for view by the user. The marketing content may be displayed while performing the process, or while the computing device 103 is idly waiting to be used by the next user. The marketing content may be pushed to the computing device 103 from the stored value card activation server 102 on an on-demand type basis. For example, the administrator of the stored value card activation server 102 may selectively push marketing content to be displayed based upon monetary payment of the merchant to be advertised. Thus, the marketing content may be pushed onto one, all, or only a selected subset of computing devices 104. The marketing content may be presented in any suitable form, such as a video segment, an animation, a text message, audio message, or any combination thereof. Additional details related to generating advertising content to be displayed on the computing device are described in U.S. patent application Ser. No. 13/946,749, filed Jul 19, 2013, and entitled "Stored Value Card Display Advertising System and Method," which is hereby incorporated herein by reference in its entirety.

Figure 6:
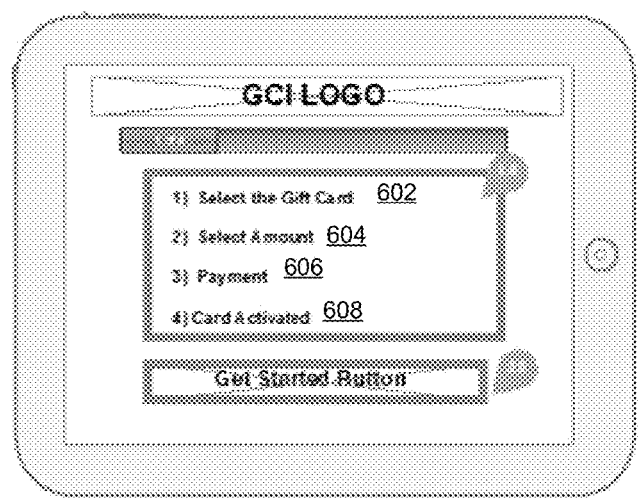
FIG. 6 illustrates an example of a first or main screen display of a user interface according to an aspect of the stored value card activation system.

The advertising screen (FIG. 5) includes a "Buy Now" button 502 that when selected by a consumer, causes the application 204 to generate a main screen display (FIG. 6) showing elements such as text and graphics describing and explaining use of the system. Typically, the main screen display also includes text and graphics comprising primary navigation elements, such as a "Select the Gift Card" button 602, a "Select Amount" button 604, a "Payment" button 606, and a "Card Activated" button 608 that may be selected by the user for directing the flow of the stored value card activation process.

Figure 7:
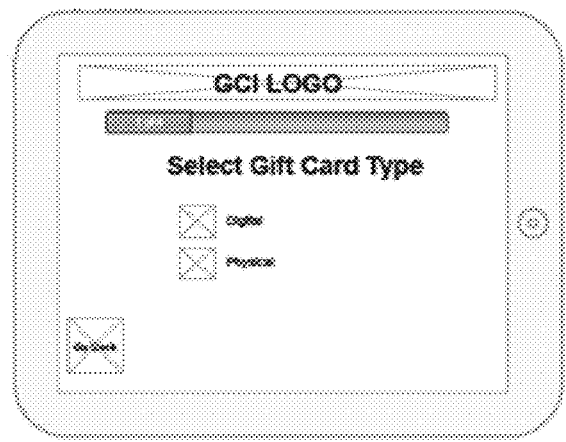
FIG. 7 illustrates an example of a gift card type selection screen of a user interface according to an aspect of the stored value card activation system.

In step 404, the stored value card activation application 204 receives selection of a stored value card from the computing device 103. For example, the application 204 may generate a gift card type selection screen (FIG. 7) that allows the user to select whether a digital (e.g., electronic) or physical gift card is to be activated.

Figure 8:
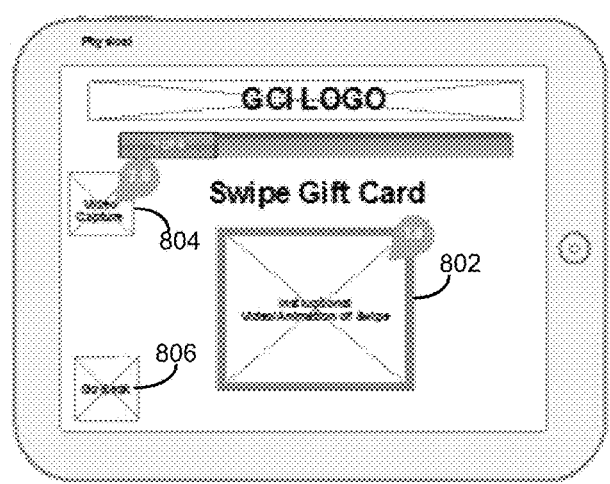
FIG. 8 illustrates an example of a physical gift card selection screen of a user interface according to an aspect of the stored value card activation system.

If a physical gift card type is selected, the gift card application 204 may generate a gift card selection screen (FIG. 8) that instructs the user to swipe a gift card through the card reader 112 of the kiosk 100. For example, multiple blank (non-activated) physical gift cards that are associated with one or more merchants may be stored in the pockets 108 of the kiosk 100. The user may select one of these non-activated gift cards and swipe the selected stored value card according to instructions provided on the gift card selection screen as shown in FIG. 8.

The gift card type selection screen also includes other features, such as a view window 802, a video capture window 804, and a "Go Back" button 806 that causes the application 204 to revert back to the previously displayed screen. The view window 804 displays useful or entertaining information to the consumer, such as an instructional video demonstrating how a stored value card which has been selected by the consumer is to be swiped through the card reader 112. Nevertheless, the view window 802 may display any desired content for view by the consumer, such as an advertisement for enhancing appeal of the stored value cards. The video capture window 804 displays video imagery obtained by the camera 110. Certain embodiments of the video capture window 804 may deter theft or vandalism by showing to consumers that their actions are being monitored by the system.

Figure 9:
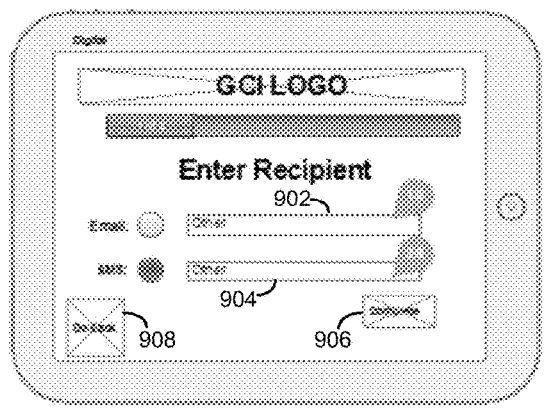
FIG. 9 illustrates an example of a digital gift card selection screen of a user interface according to an aspect of the stored value card activation system.

If a digital gift card rather than a physical gift card is selected by the consumer, the application 204 generates a recipient information entry screen (FIG. 9) that receives recipient information from the consumer. The recipient information entry screen includes an email entry field 902, an SMS entry field 904, a "Complete" button 906, and a "Go Back" button 908 that causes the application 204 to revert back to the previously displayed screen. The email and SMS (i.e., text message) entry fields 902, 904 provide for entry of an e-mail address and phone number, respectively, associated with the recipient. Once entry of recipient information is received from the recipient information entry screen, the application 204 displays the gift card selection screen (FIG. 8) for receiving a stored value card type from the consumer.

In one embodiment, the stored value card activation application 204 may receive personalized stored value card information, such as customized textual, audio, images, photographic, and/or video content to be included with the stored value card. For example, the stored value card activation application 204 may receive customized content, such as an audio or video segment recorded by a microphone or camera, respectively configured on the computing device 103 to be included with an e-stored value card to be delivered to the recipient. As another example, the stored value card activation application 204 may receive location information from the computing device 103 and generate customized content to be included with the stored value card, such as a background image commemorating a particular location at which the kiosk 100 is placed. Additional details related to personalizing the stored value card according to user-supplied content received from the user are described in U.S. Provisional Patent Application Ser. No. 61/737,731, filed Dec. 14, 2012, and entitled "Online Personalized Gifting System," which is a continuation in part of application Ser. No. 13/273,220, filed Oct. 13, 2011, and entitled "Online Personalized Gifting System." The contents of 61/737,731 and Ser. No. 13/273,220 are both incorporated herein by reference in their entirety.

Figure 10:
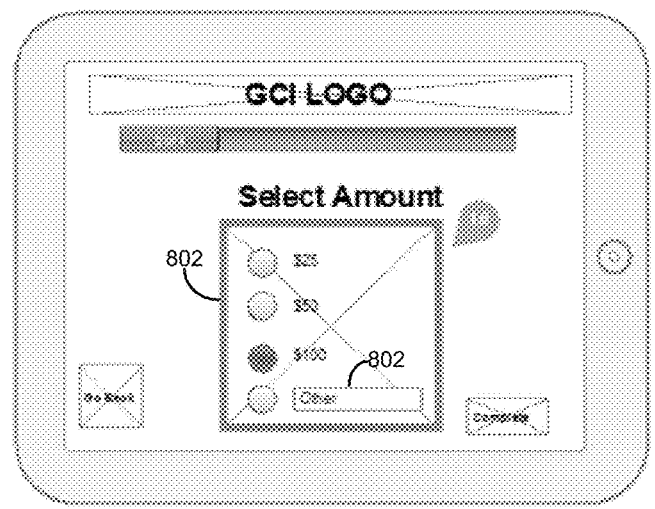
FIG. 10 illustrates an example of a gift card amount selection screen of a user interface according to an aspect of the stored value card activation system.

In step 406, the stored value card activation system receives a monetary amount to be assigned to the gift card. When gift card type information has been entered, a gift card amount selection screen (FIG. 10) may be displayed by the stored value card activation application 204 for presentation to the user. Using the gift card amount screen, the user may select a predetermined amount displayed on the screen, or may enter a variable amount if allowed by the merchant associated with the gift card. For example, the gift card amount selection screen includes an amount selection window 1002 that includes one or more radio buttons 1004 indicating a predetermined amount that may be selected by the user as well as an entry field 1006 for entry of a customized monetary amount to be entered by the user.

In one embodiment, the application 204 stores information in the data source 206 for each merchant indicating the various predetermined amounts that may be provided for gift cards from that merchant and whether or not the merchant allows customized monetary values to be allocated to their gift cards. When the gift card amount selection screen is displayed, the application 204 displays those values in the amount selection window 1002 and the entry field 1006 for entry of a customized monetary amount if the merchant support such an amount.

Figure 11:
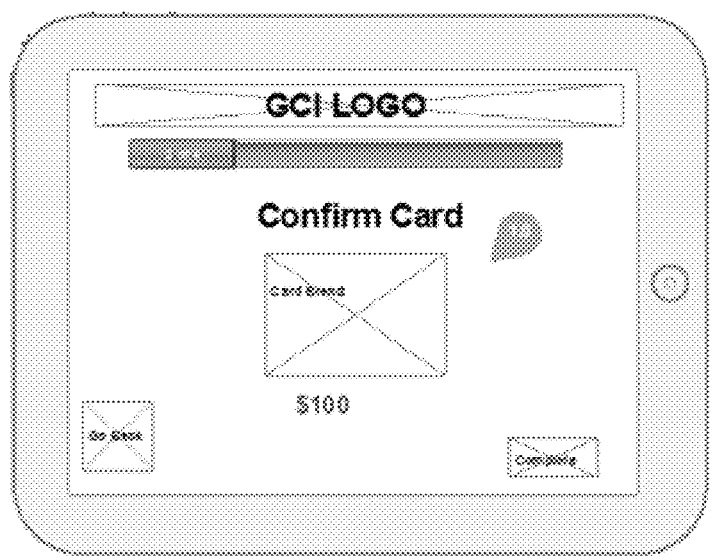
FIG. 11 illustrates an example of a confirmation screen of a user interface according to an aspect of the stored value card activation system.

Following receipt of a monetary amount to be associated with the gift card, the application displays a confirmation screen (FIG. 11) for receiving input from the user that the selected monetary value is confirmed.

Figure 12:
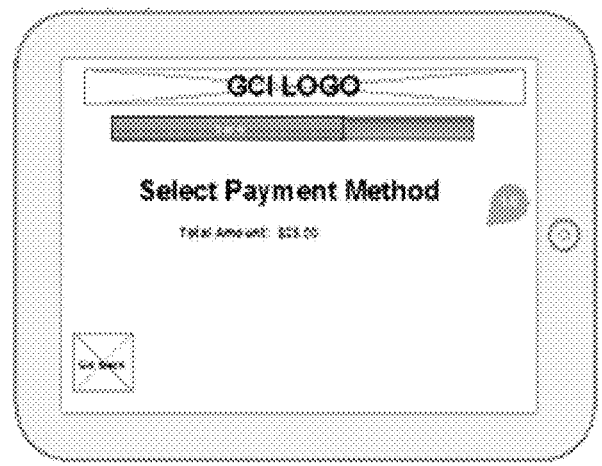
FIG. 12 illustrates an example of a payment method screen of a user interface according to an aspect of the stored value card activation system.
Figure 13:
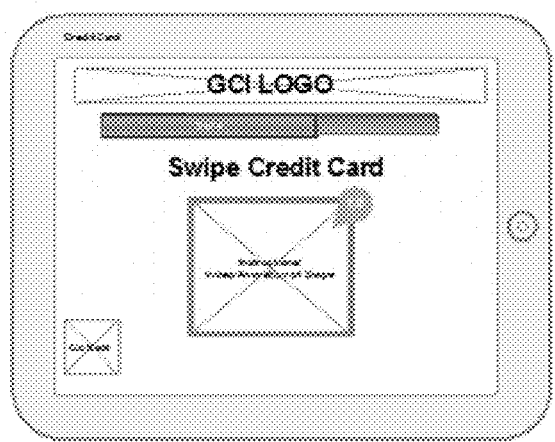
FIG. 13 illustrates an example of a credit card entry screen of a user interface according to an aspect of the stored value card activation system.
Figure 14:
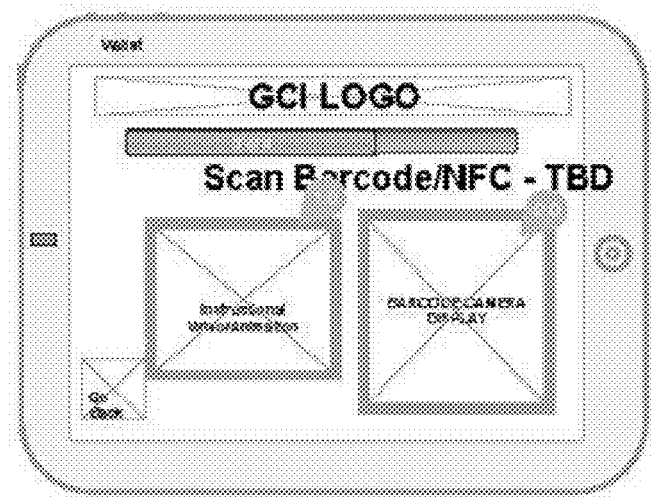
FIG. 14 illustrates an example of another payment screen of a user interface according to an aspect of the stored value card activation system.

In step 408, the stored value card activation application 204 receives payment from the user. For example, the stored value card activation application 204 may generate a payment selection screen (FIG. 12) requesting information associated with the desired type of payment from the user. The payment selection screen may be configured to accept any suitable form of payment from the user. For example, the payment selection screen may accept payment from the user using a technology such GOOGLE WALLET™ or PASSBOOK™. As another example, the payment selection screen may accept payment from the user in the form of a credit card payment. If the user selects a credit card type payment, the stored value card activation application 204 may display a credit card entry screen (FIG. 13) instructing the user to swipe his or her credit card in the card reader 112 of the kiosk 100. Alternatively, if the user select some other form of payment, the stored value card activation application 204 may display another payment screen (FIG. 14) that receives information for one or more other forms of payment, such as by a payment card that is to communicate account information, such as by using barcode, near field communications (NFC), and the like.

Figure 15:
FIG. 15 illustrates an example of a checkout screen of a user interface according to an aspect of the stored value card activation system.
Figure 16:
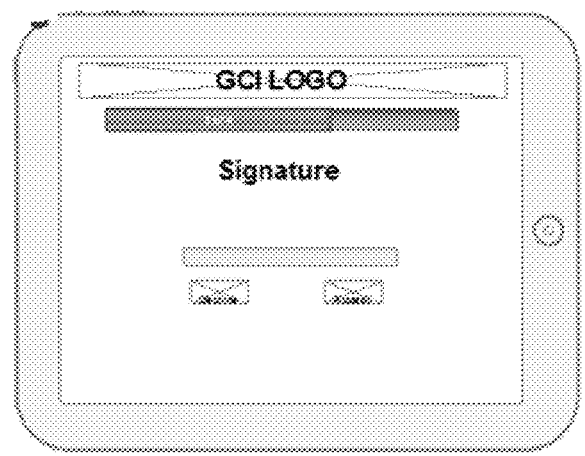
FIG. 16 illustrates an example of a signature entry screen of a user interface according to an aspect of the stored value card activation system.

The stored value card activation application 204 may also generate a confirmation screen (FIG. 15) that displays the monetary amount to be withdrawn from the user's account along with a "Decline" button 1502 and an "I Accept Charges" button 1504 to allow the user to enter whether the displayed amount is acceptable. Additionally, the stored value card activation application 204 may also display a signature entry screen (FIG. 16) for entry of the user's signature. The stored value card activation application 204 uses the received information to effect or complete payment by the user, such as from the user's financial account.

Figure 17:
FIG. 17 illustrates an example of a purchase confirmation screen of a user interface according to an aspect of the stored value card activation system.

In step 410, the stored value card activation application 204 facilitates activation of the gift card. In one embodiment, the server 202 communicates with a financial account server 210 of the user to provide payment for the activated gift card by the user. In another embodiment, the server 202 provides gift card type information, monetary amount information, and payment information to the stored value card activation server 208 such that the stored value card activation server 208 conducts the transaction by communicating with the financial account server 210 and activating the gift card associated with the transaction. For example, the stored value card activation application 204 may display a purchase confirmation screen (FIG. 17) to show the user that the transaction has been successfully completed.

Figure 18:
FIG. 18 illustrates an example of a thank you screen of a user interface according to an aspect of the stored value card activation system.

In one embodiment, the purchase confirmation screen includes a SMS entry field 1702, an email entry field 1704, and a "No Thanks" button 1706 to be selected by the user when a receipt for the transaction is not desired by the user. The entry field 1702 and the email address entry field 1704 for entry of either a phone number or an email address of the user for sending a receipt associated with the completed transaction. When either the SMS entry field 1702, the email entry field 1704, or the "No Thanks" button 1706 is entered by the user, the application 204 then displays a thank you screen (FIG. 18) indicating that interaction of the user with the system for the transaction has been completed.

The application 204 may repeat the above-described steps to activate other stored value cards for the same user or other users. Nevertheless, when use of the stored value card activation system is no longer needed or desired, the process ends.

It should be appreciated that the steps described herein are provided only as an example of a process that is performed by the stored value card activation application 204 according to the teachings of the present invention, and that the stored value card activation application 204 may perform fewer, more, or different types of steps than those described herein. For example, the stored value card ordering application 204 performs multiple steps described above as a single step, or perform a single step as multiple, distributed steps. As another example, certain steps described herein is performed by other components of the stored value card activation system 200, such as by the computing device 108 used by the user, the stored value card activation server 208, and/or the financial account server 210 of the user.

Figure 19:
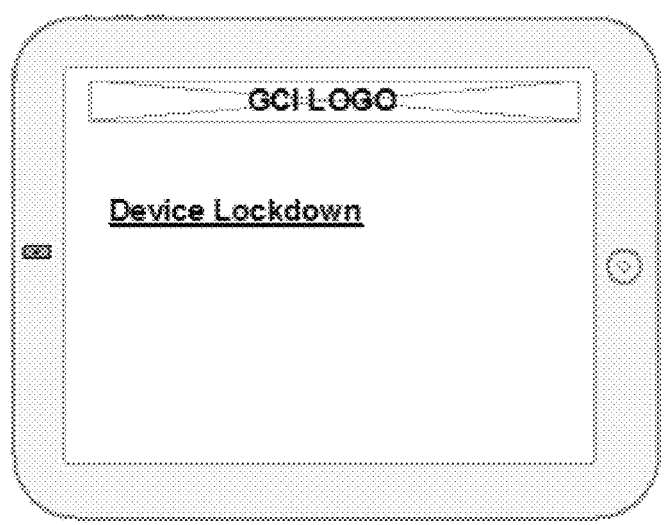
FIG. 19 illustrates an example of a lockdown screen of a user interface according to an aspect of the stored value card activation system.
Figure 20D:
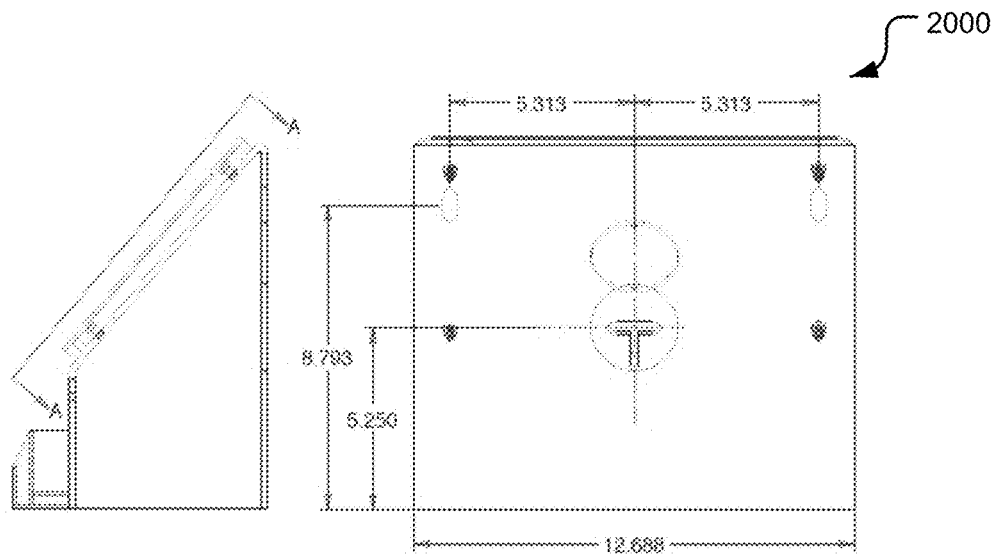
Figure 20E:
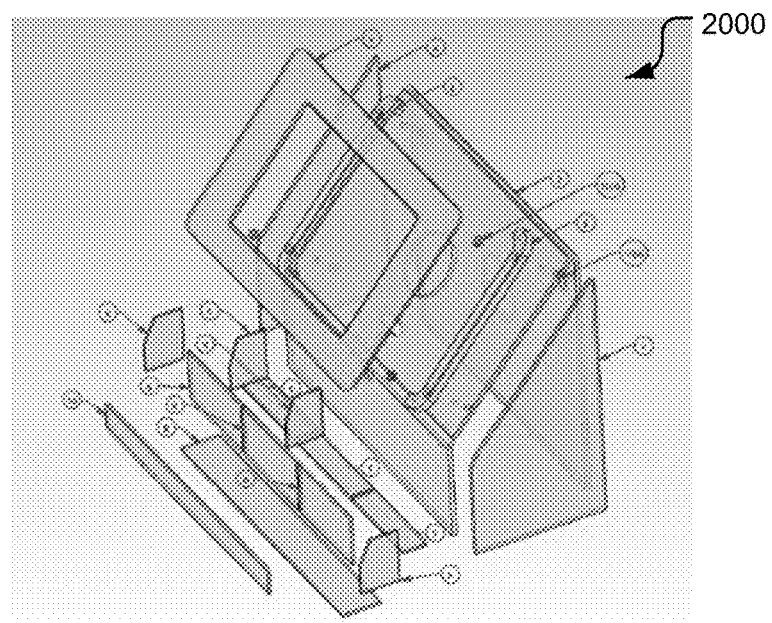

In one embodiment, the stored value card activation application 204 may also possess the capability of locking (e.g., disabling) the computing device 103 in the event that a fault condition occurs or a fraudulent event is detected. For example, if a particular user attempts to process the transaction using an invalid credit card for a specified number of times, the stored value card activation application 204 may disable the computing device 103, display a lockdown screen (FIG. 19), and generate an alarm to alert personnel of the potentially fraudulent event.

In another embodiment, the stored value card activation system 100 may include one or more security features. The stored value card activation server 202 may receive and store images that are received periodically (e.g., every five seconds) or received at certain events using the camera 110 mounted on the kiosk 100. The images may be stored for a specified amount of time such that personnel who administer the use of the stored value card activation system 100 may forensically may obtain facial identification of the fraudulent user.

For a particular embodiment in which the computing device 103 is a tablet computer, a specified executable application (i.e., an app) may be used to generate the GUI from which information is received from the user. The operating software may be configured as a permissions-based format such that the user is only allowed to execute the app for administering the stored value card activation system 100. That is, the user is inhibited from executing any other application on the computing device 103. Additionally, the app may be locked (i.e., inhibited from executing) in response to detection of a fraudulent event and/or due to malfunction of the system. The stored value card activation server 102 may also include a GUI such that an administrator of the stored value card activation system 100 may remotely access the computing device 103, and have administrative privileges (e.g. super user mode) that can be accessed via a unique key combination (e.g., password access) for servicing, maintaining, or otherwise administering the operation of the computing device 103. The tablet computer may also be physically coupled to a tether or cable to prevent its theft.

FIGS. 20A through 20E illustrate another example stored value card kiosk 2000 according to the teachings of the present disclosure. The stored value card kiosk 2000 includes a computing device 2002 that functions similarly to the computing device 103 as described above with reference to FIG. 1. Additionally, the computing device 2002 functions with the stored value card activation system 200 as described above with reference to FIGS. 2 through 17 in a similar manner as the computing device 103 of FIG. 1. The stored value card kiosk 2000, however, differs from the stored value card kiosk 100 of FIG. 1 in that the stored value card kiosk 2000 includes a counter-top housing 2004 that is to be mounted on a counter-top, such as a table, counter-top, or other suitable elevated support structure.

The counter-top housing 2002 has a bottom end 2006 for support from and/or mounting to a typical counter-top, and is dimensioned such that a user may access the GUI in a relatively comfortable manner. In the particular embodiment shown, for example, the counter-top housing 2004 has a height of 10.406 inches, a width of 12.688 inches, and a depth of 5.375 inches. Nevertheless, other embodiments of the counter-top housing 2004 may have other dimensions without departing from the spirit or scope of the present disclosure. For example, a wall-mounted housing, floorstand, or free standing housing may be used.

The counter-top housing 2004 may be made of any suitable material, such as wood, composites, plastic, and/or metal that supports the computing device 2002 in a structurally sound manner. The counter-top housing 102 may also include one or more pockets 2008, shelves, or containers for housing various ancillary items, such as blank (non-activated) stored value cards and/or paraphernalia associated with stored value cards.

Figure 21A:
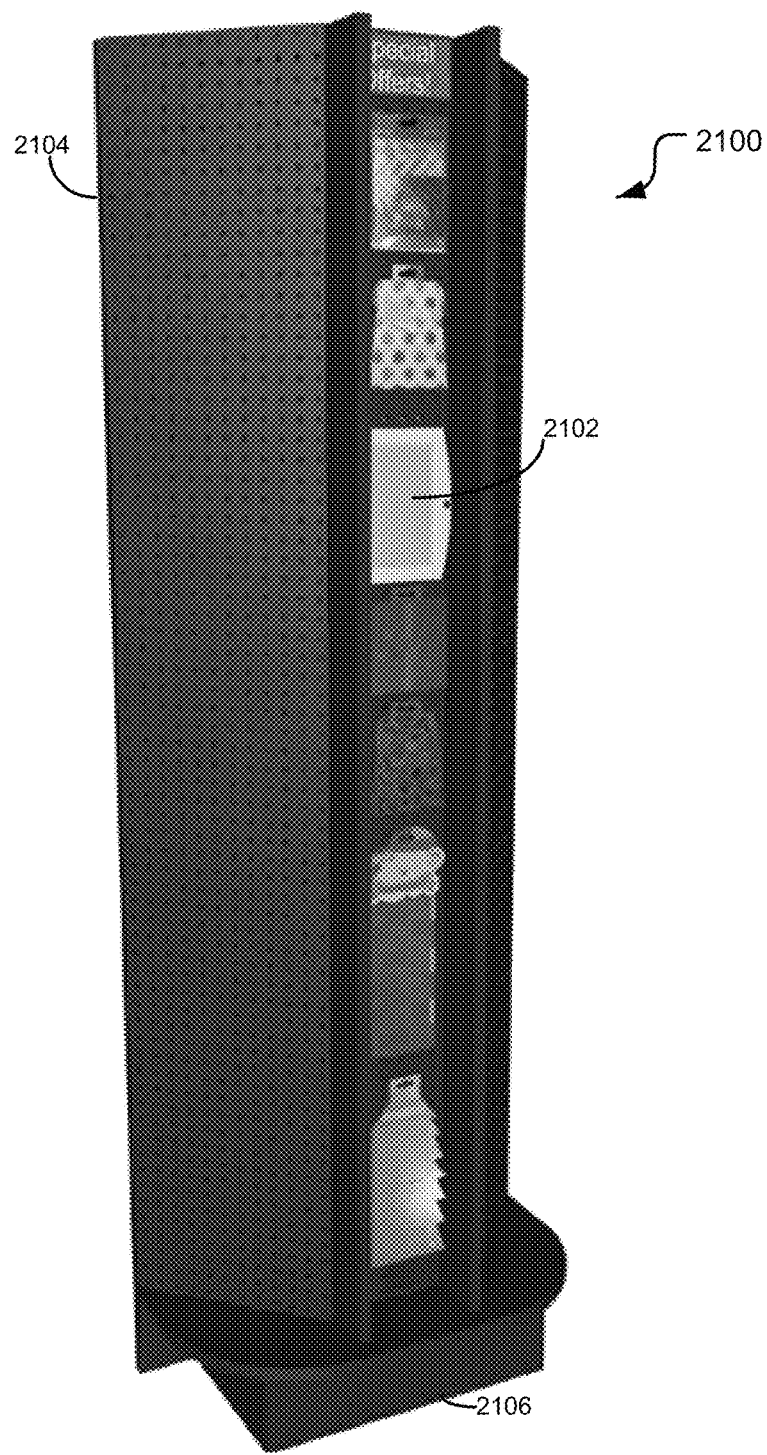
FIGS. 21A through 21D illustrate another example stored value card kiosk according to the teachings of the present disclosure.
Figure 21B:
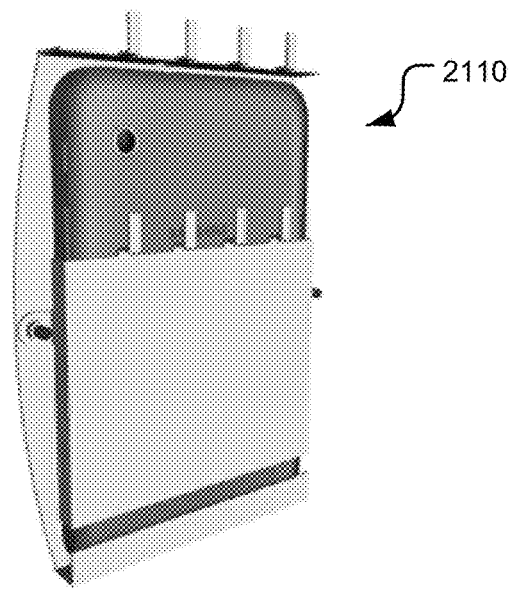
Figure 21C:
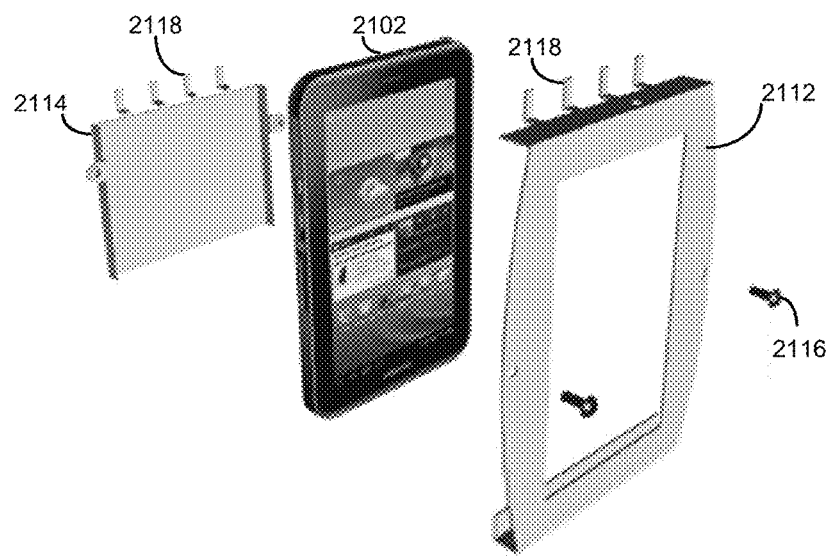
Figure 21D:
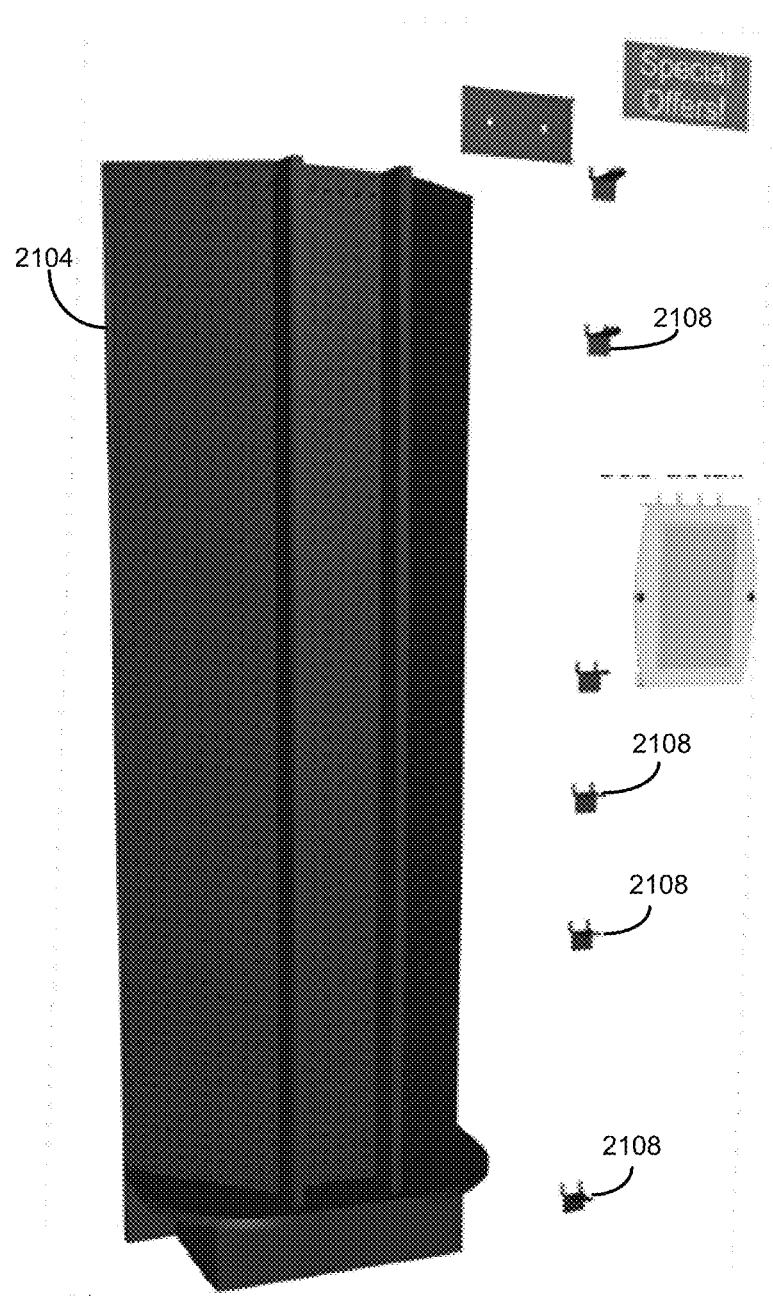

FIGS. 21A through 21C illustrate another example stored value card kiosk 2100 according to the teachings of the present disclosure. The stored value card kiosk 2100 includes a computing device 2102 that functions similarly to the computing device 103 as described above with reference to FIG. 1. Additionally, the computing device 2102 functions with the stored value card activation system 200 as described above with reference to FIGS. 2 through 17 in a similar manner as the computing device 103 of FIG. 1. The stored value card kiosk 2100, however, differs from the stored value card kiosk 100 of FIG. 1 in that the stored value card kiosk 2100 includes a retail display housing 2104 that is to display other retail sale items along with the computing device 2102.

The particular retail display housing 2104 as shown has a floorstand-like structure with a bottom end 2106 for support from a floor. In other embodiments, retail display housing 2104 may be dimensioned for support from any suitable surface, such as, for example, a counter-top, a floor, a shelf, or a wall. The retail display housing 2104 may be made of any suitable material, such as wood, plastic, composites, and/or metal, that supports the computing device 2102 in a structurally sound manner. The retail display housing 2104 may also include multiple regularly spaced holes that are designed to accept hooks 2108 for hanging other retail sale items, such as stationary, postcards, or other gifting paraphernalia.

The retail display housing 2104 includes a chassis 2110 for securing the computing device 2102 to the retail display housing 2104. The chassis 2110 generally includes a front plate 2112 and a back plate 2114 that securely confine the computing device 2102 therebetween using tamper resistant screws 2116. The front plate 2112 and back plate 2114 include hooks 2118 that, when inserted into holes of the retail display housing 2104, prevent removal of the chassis 2110 from the retail display housing 2104.

Figure 22A:
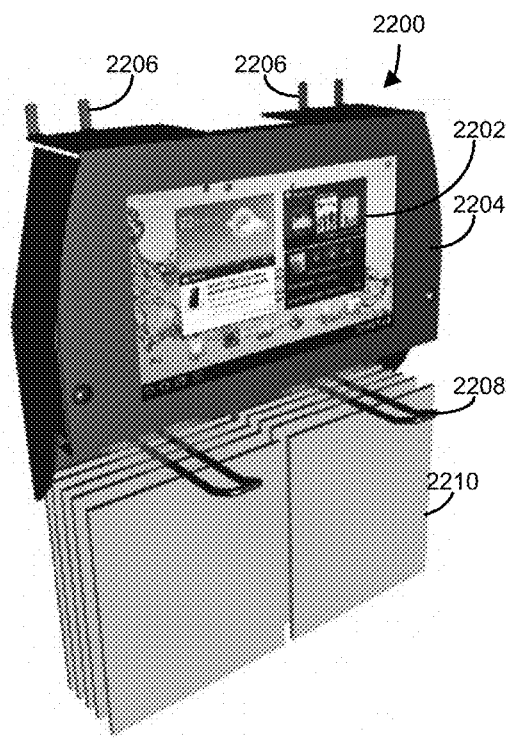
FIGS. 22A through 22C illustrate an example retail display housing according to the teachings of the present disclosure.
Figure 22B:
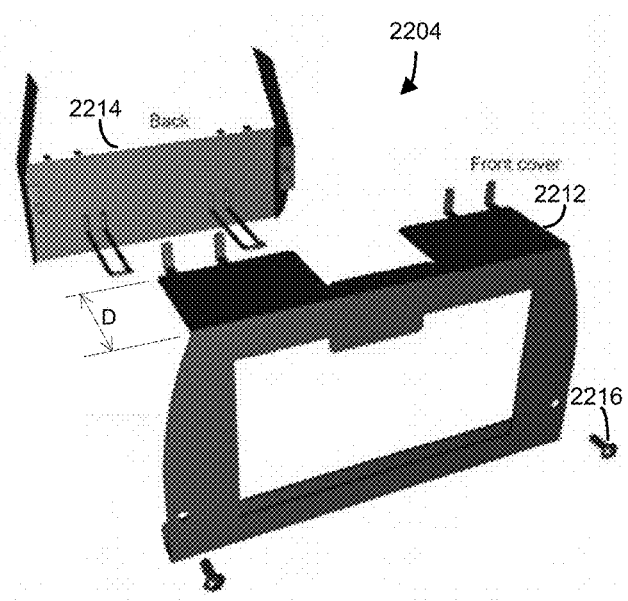
Figure 22C:
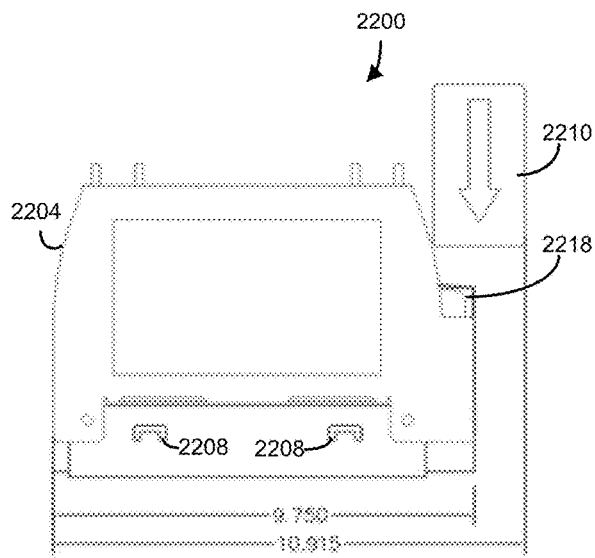

FIGS. 22A through 22C illustrate another example stored value card kiosk 2200 according to the teachings of the present disclosure. The stored value card kiosk 2200 houses a computing device 2202 that functions similarly to the computing device 103 as described above with reference to FIG. 1. Additionally, the computing device 2202 functions with the stored value card advertising system 200 as described above with reference to FIGS. 2 through 17 in a similar manner as the computing device 103 of FIG. 1. The stored value card kiosk 2200, however, includes a chassis 2204 that differs from the chassis 2110 of FIG. 21B in that the chassis 2204 supports the computing device 2202 such that its display is oriented in a landscape mode as opposed to the computing device 2110 that has the display of its computing device 2102 oriented in a portrait mode.

The chassis 2204 as shown has a third party display mounting structure with hooks 2206 to be supported from holes in a third party display. The third party display may be any retail display structure that is configured to display retail items. Examples of such third party displays may include, for example, the retail display housing 2104 of FIGS. 21A through 21C having a peg-board like structure for placement of various retail items. In other embodiments, the chassis 2204 may include any type of securement mechanism for mounting to any wall. The chassis 2204 may be hung from any suitable wall structure. For example, the chassis 2204 may be hung at an elevation that conforms to the Americans with Disabilities Act of 1990 (ADA) requirements.

The computing device 2204 may be any type and size. In one example, the computing device 2204 is a tablet computer having a 7.0 inch display size. A tablet computer having such a size may be well accommodated into certain stored value card display corner posts.

The chassis 2204 may be made of any suitable material, such as wood, plastic, composites, and/or metal, that supports the computing device 2202 on a wall in a structurally sound manner. The retail display housing 2202 also includes two pegs 2208 for supporting and displaying stored value cards 2210 in close proximity to the computing device 2202. Nevertheless, any quantity of pegs 2208 may be used.

The chassis 2204 with a front plate 2212 and a back plate 2214 for secure confinement of the retailer computing device 2202 using one or more tamper resistant screws 2216 such that the computing device 2203 is securely mounted to an outer surface of a wall on which the retail display housing 2200 is hung. The front plate 2212 includes a display hole to provide visibility of the display from in front of the retail display structure. Additionally, the tamper resistant screws 2216 may be configured on the chassis 2204 such that they may also extend through a wall on which the chassis 2204 is hung to secure the chassis 2204 to the wall.

The chassis 2204 has a depth D that supports the computing device 2202 at a specified distance in front of the wall on which it is mounted. In the particular embodiment shown, the chassis 2204 has a depth of approximately 2.0 inches for supporting the computing device 2202 in front of a wall on which it is mounted. Nevertheless, other embodiments of the chassis 2204 may have any desired depth D without departing from the spirit or scope of the present disclosure. Embodiments that support the computing device 2204 a specified depth in front of a wall may provide an advantage in that the computing device 2202 may be maintained closer to customers for increased eye appeal. Additionally, the chassis 2204 requires relatively little floor space at a retail location; that is, it may be configured on an existing display shelf or other structure in a retail location without the use of any additional support structure that consumes floor space.

In one embodiment, the chassis 2204 provides a closed frame around the computing device 2204 such that the top and the back of the computing device 2204 is covered, thus restricting access to these portions of the computing device 2204. Additionally, the chassis 2204 is formed such that, when the computing device 2204 is housed therein, only certain physical ports of the computing device 2204 are accessible. That is, the front plate 2212 and/or back plate 2214 may include one or more tabs for concealing physical ports that are to be restricted from access when the computing device 2204 is housed in the chassis 2204. For example, the chassis 2204 may include a tab or other physical feature that covers certain critical buttons of the computing device 2202, such as its "home" button or power button, to prevent their actuation.

As best shown in FIG. 22C, a card reader 2218 is configured on the chassis 2204 for receiving identification information associated with a stored value card to be purchased by a user, and financial information associated with a financial account of the user, such as credit card information provided by the user. For example, FIG. 22C shows a stored value card 2210 in the process of being swiped through the card reader 2218. As shown, the chassis 2204 has an overall width of 9.750 inches with a width of 10.915 inches for providing clearance for swiping the stored value card 2210 and/or credit card of the user. Nevertheless, the chassis 2204 may have any suitable dimensional constraints for providing sufficient clearance for its display and for swiping a stored value card and/or credit card of a user. In one particular example, the card reader 2218 may be configured on the front surface of the chassis 2204 such that additional clearance width is not necessary for swiping the stored value card and/or credit card of the user.

Figure 23A:
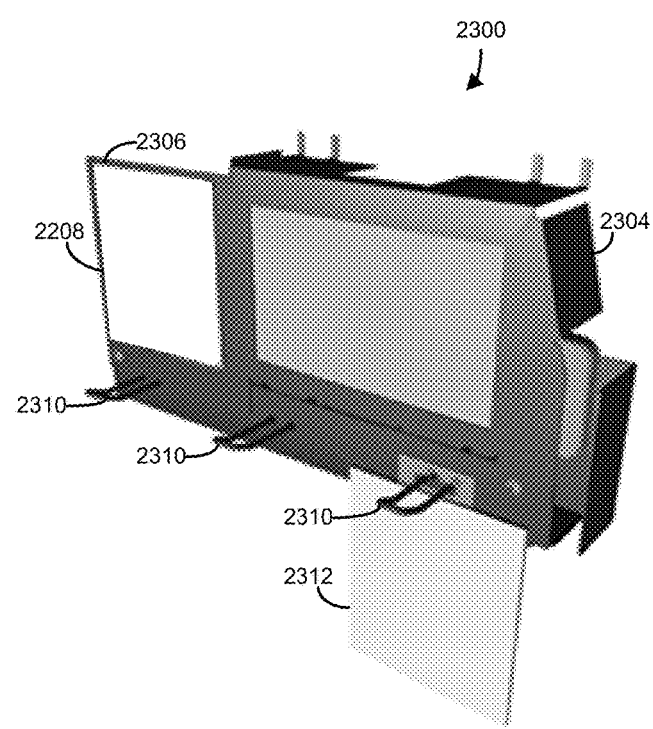
FIGS. 23A through 23C illustrate an example retail display housing according to the teachings of the present disclosure.
Figure 23B:
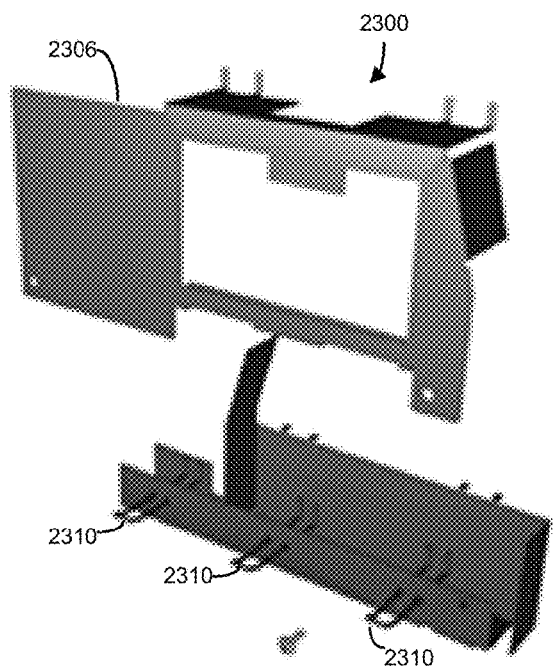
Figure 23C:
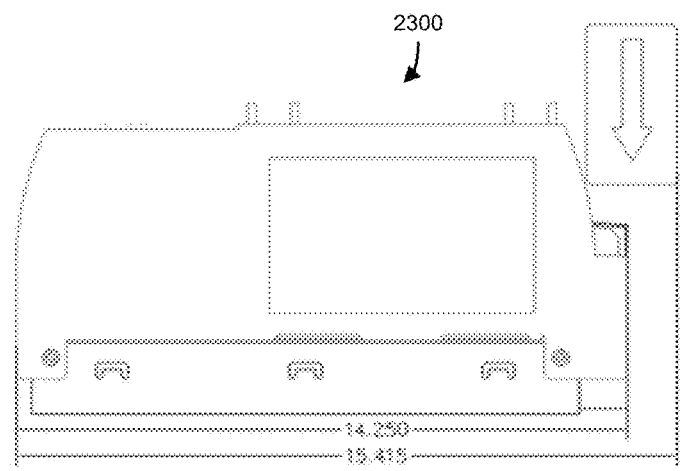

FIGS. 23A through 23C illustrate yet another example stored value card kiosk 2300 according to the teachings of the present disclosure. The stored value card kiosk 2300 includes a computing device 2302 that functions similarly to the computing device 103 as described above with reference to FIG. 1. Additionally, the computing device 2302 functions with the stored value card advertising system 200 as described above with reference to FIGS. 2 through 17 in a similar manner as the computing device 103 of FIG. 1. The stored value card kiosk 2300 also includes a chassis 2304 for housing the computing device 2302 in a manner similar to the chassis 2204 of the stored value card kiosk 2200 of FIGS. 22A through 22C. The chassis 2304 differs, however, in that it includes a front plate with a generally flat-shaped display region 2306 for releasable mounting of a promotional graphic image 2308 thereon. The chassis 2304 of the kiosk 2300 also differs from the chassis 2200 of the kiosk 2200 of FIGS. 22A through 22C in that three hooks 2310 are provided for support of unactivated gift cards 2312 on the kiosk 2300.

Preferably, the graphic image 2308 includes advertising content that promotes the sales of gift cards 2312 displayed on the kiosk 2300. For example, the graphic image 2308 includes an animated image and overlaying text portraying some positive trait of at least one of the gift cards 2312 displayed on the kiosk 2300. The graphic image 2308 as shown is formed on a generally rectangular-shaped piece of card stock that is mounted to the display region 2306 using releasable adhesive or other releasable attachment means.

Figure 24:
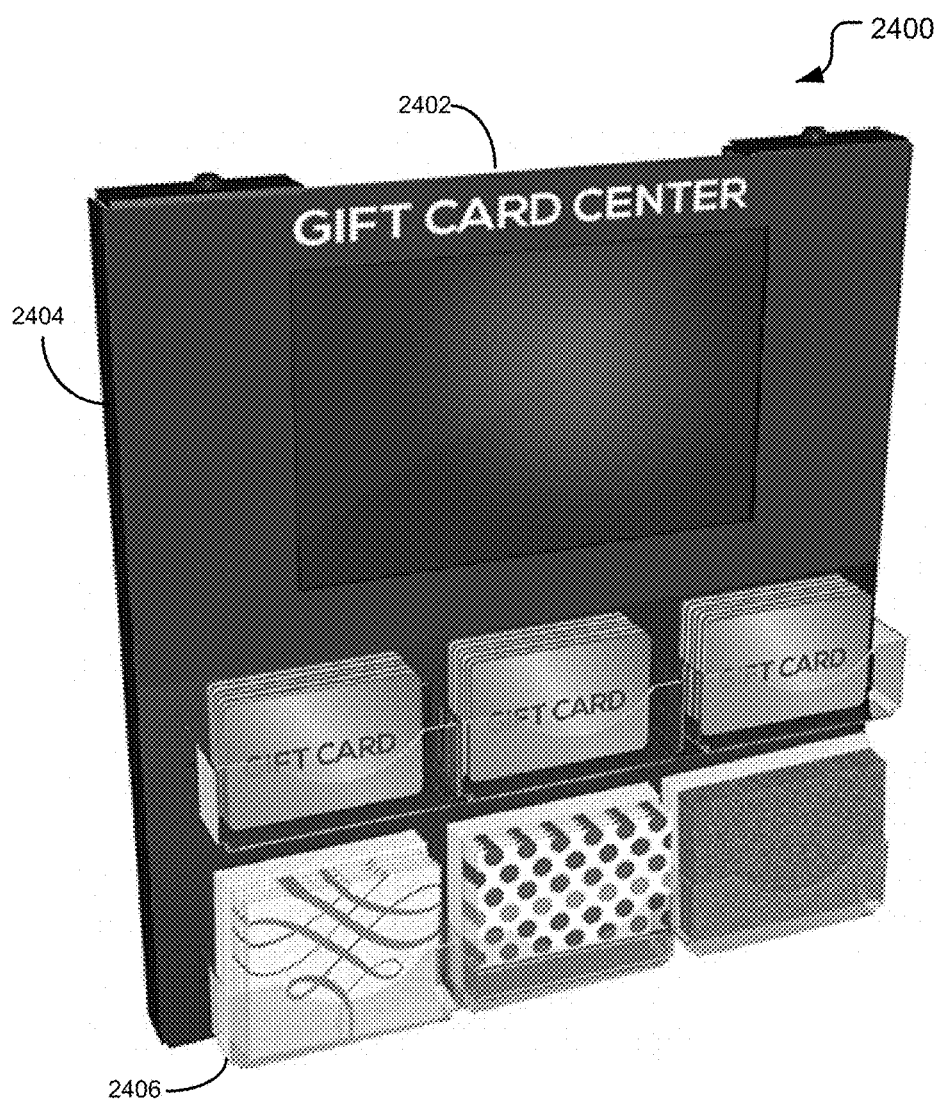
FIG. 24 illustrates another example retail display housing according to the teachings of the present disclosure.

FIG. 24 illustrates yet another example stored value card kiosk 2400 according to the teachings of the present disclosure. The stored value card kiosk 2400 houses a computing device 2402 that functions similarly to the computing device 2102 as described above with reference to FIGS. 21A through 21C. Additionally, the computing device 2402 functions with the stored value card advertising system 200 as described above with reference to FIGS. 2 through 17 in a similar manner as the computing device 103 of FIG. 1. The stored value card kiosk 2400 differs however from the stored value card kiosk 2100 of FIGS. 21A through 21C in that the stored value card kiosk 2400 includes a generally rectangular-shaped housing 2404 configured to be hung from a wall.

The particular stored value card kiosk 2404 as shown has a wall-mount structure adapted for hanging from a wall using any suitable mounting mechanism. For example, the kiosk 2404 includes holes in the housing 2404 that are configured to accept anchors or screws that may be secured to a wall. Another example mounting mechanism includes one or more pegs that are shaped for insertion into a track mounting system or other system having a slot or depression that entraps the pegs. Other example of suitable mounting mechanisms may include adhesives, suction cups, magnets, zip ties, and the like.

The stored value card kiosk 2404 includes one or more pockets 2406 for holding stored value cards 2408 is close proximity to the computing device 2402. The pockets 2406 are formed of a 0.060 inch thick sheet of transparent material, such as glycol-modified polyethylene terephthalate (PETG), although any suitable material may be used. Each pocket is approximately 2.0 inches deep for securely holding the stored value cards while allowing partial exposure so that they may be easily removed by users.

Several embodiments including the floorstand housing, the counter-top housing, the retail display unit, the wall mount housing, and the third party attachment housing have been described above for providing a structure for facilitating a stored value card advertising platform. Nevertheless, it should be understood that the afore-described housings may have additional, fewer, or different features than described herein. For example, other embodiments of the counter-top housing, the retail display unit, the wall mount housing, or the third party attachment housing may have different dimensions than the embodiments described above. As another example, other embodiments of the counter-top housing, the retail display unit, the wall mount housing, or the third party attachment housing may have more than one computing device (e.g., two or more computing devices) configured thereon for displaying advertising content for consumers. As yet another example, other embodiments of the counter-top housing, the retail display unit, the wall mount housing, or the third party attachment housing may include one, both, or none of the card reader 112, and/or cash processing unit 114 that is used for processing transactions with consumers who use the stored value card kiosk.

Those skilled in the art will appreciate that variations from the specific embodiments disclosed above are contemplated by the invention. The invention should not be restricted to the above embodiments, but should be measured by the following claims.

What is claimed is:

1. A gift card activation system comprising:
a kiosk computing device displaying, via a touchscreen display, a plurality of non-activated gift cards and programmed to:
receive, from a user, via the touchscreen display, a selection of one of the plurality of non-activated gift cards;
receive, from the user, monetary amount information to be associated with the selected gift card from the kiosk;
receive, from the user, payment information, via a magnetic card reader, for the selected gift card;
a server comprising at least one memory and at least one processor, the at least one memory comprising computer executable instructions configured to, when executed by the processor:
receive gift card type information associated with the selected one of the plurality of non-activated gift cards;
receive the monetary amount information;
receive the payment information;
facilitate a financial transaction with a financial account server associated with an account of the user to provide payment for the gift card;
identify, using a lookup table, a preferred third party gift card activation server that is configured to activate the gift card for a merchant of the gift card, the preferred third party gift card activation server selected from among a plurality of third party gift card activation servers that each activates gift cards for a plurality of merchants, the preferred third party gift card activation server managed by an entity that is separate and distinct from the merchant of the gift card, the lookup table storing information associated with the preferred third party gift card activation server and one or more other third party gift card activation servers for each of the plurality of merchants;
when the preferred third party gift card activation server has been determined not to be available, identify one of the other third party gift card activation servers that is configured to activate the gift card using the lookup table; and
activate the selected gift card in accordance with the financial transaction by communicating with the one other gift card activation server.

2. The system of claim 1, wherein the computer executable instructions are further configured to:
receive the payment information from the user;
conduct the financial transaction with the financial account server; and
activate the selected gift card in accordance with the conducted financial transaction.

3. The system of claim 1, wherein the computer executable instructions are further configured to:
receive the gift card type information, the monetary amount information, and the payment information from the user; and
transmit the gift card type information, the monetary amount information, and the payment information to the other gift card activation server associated with a merchant of the selected gift card,
wherein the other gift card activation server conducts the financial transaction with the financial account server, and activates the selected gift card using the gift card type information, the monetary amount information, and the payment information.

4. The system of claim 1, wherein the gift card comprises a digital gift card and the computing device comprises a tablet computer that is to transmit the selected gift card to a recipient via a messaging service.

5. The system of claim 1, wherein the plurality of gift cards are associated with multiple different merchants.

6. The system of claim 1, wherein the other gift card activation server is managed by the merchant.

7. A gift card activation method comprising:
receiving, using a first processor in a kiosk displaying a plurality of non-activated gift cards that executes instructions stored in a memory, via a first input device, gift card type information associated with a selected one of a plurality of non-activated gift cards from a computing device configured in a kiosk;
receiving, using the first processor, via the first input device, monetary amount information to be associated with the selected gift card from the kiosk;
receiving, using the first processor, via a second input device, payment information from a user of the kiosk;
storing the payment information along with location information,
wherein the location information is obtained from a location detection device;
facilitating, using a second processor in a server, a financial transaction with a financial account server associated with an account of the user to provide payment for the gift card;
identifying, using the second processor, using a lookup table, a preferred third party gift card activation server that is configured to activate the gift card for a merchant of the gift card, the preferred third party gift card activation server selected from among a plurality of third party gift card activation servers that each activates gift cards for a plurality of merchants, the preferred third party gift card activation server managed by an entity that is separate and distinct from the merchant of the gift card, the lookup table storing information associated with the preferred third party gift card activation server and one or more other third party gift card activation servers for each of the plurality of merchants; and
when the preferred third party gift card activation server has been determined not to be available, identifying, using the second processor, one of the other third party gift card activation servers that are configured to activate the gift card using the lookup table; and
activating, using the second processor, the selected gift card in accordance with the financial transaction by communicating with the other gift card activation server.

8. The method of claim 7, further comprising:
receiving the payment information from the user via the second input device,
wherein the second input device is a magnetic card reader;
conducting the financial transaction with the financial account server; and
activating the selected gift card in accordance with the conducted financial transaction.

9. The method of claim 7, further comprising:
receiving the gift card type information, the monetary amount information, and the payment information from the user; and
transmitting the gift card type information, the monetary amount information, and the payment information to the other gift card activation server associated with a merchant of the selected gift card,
conducting the financial transaction with the financial account server; and
activating the selected gift card using the gift card type information, the monetary amount information, and the payment information.

10. The method of claim 7, further comprising:
transmitting the selected gift card to a recipient via a messaging service, the gift card comprising a digital gift card.

11. The method of claim 7, further comprising managing the other gift card activation server by the merchant.

12. The method of claim 7, further comprising managing the other gift card activation server by a third party gift card activation server.

* * * * *